United States Patent
Shiho et al.

(10) Patent No.: US 11,042,823 B2
(45) Date of Patent: Jun. 22, 2021

(54) BUSINESS MANAGEMENT SYSTEM

(71) Applicant: Hitachi, Ltd., Tokyo (JP)

(72) Inventors: Yuma Shiho, Tokyo (JP); Masataka Tanaka, Tokyo (JP); Kouichirou Haro, Tokyo (JP); Tooru Morita, Tokyo (JP); Masanobu Minato, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 142 days.

(21) Appl. No.: 15/962,284

(22) Filed: Apr. 25, 2018

(65) Prior Publication Data
US 2018/0357582 A1 Dec. 13, 2018

(30) Foreign Application Priority Data

Jun. 7, 2017 (JP) .............................. JP2017-112513

(51) Int. Cl.
*G06Q 10/00* (2012.01)
*G06Q 10/06* (2012.01)
(52) U.S. Cl.
CPC ....... *G06Q 10/0635* (2013.01); *G06Q 10/067* (2013.01); *G06Q 10/06375* (2013.01)
(58) Field of Classification Search
None
See application file for complete search history.

(56) References Cited

U.S. PATENT DOCUMENTS

| | | | |
|---|---|---|---|
| 8,688,500 B1* | 4/2014 | Hart | G06Q 10/0635 705/7.28 |
| 8,694,356 B2* | 4/2014 | Carrato | G06Q 10/00 705/7.28 |
| 9,336,503 B2* | 5/2016 | Andelman | G06Q 10/0635 |
| 2006/0178918 A1* | 8/2006 | Mikurak | G06Q 10/06375 705/7.25 |

(Continued)

FOREIGN PATENT DOCUMENTS

JP 2013-61694 A 4/2013

OTHER PUBLICATIONS

Atin, Alireza, Project Risk Propagation Modeling of Engineering Procurement and Construction, Jan. 1, 2016, Wayne State University Dissertations, https://digitalcommons.wayne.edu/cgi/viewcontent.cgi?article=2512&context=oa_dissertations, p. 1-225. (Year: 2016).*

(Continued)

*Primary Examiner* — Joseph M Waesco
(74) *Attorney, Agent, or Firm* — Crowell & Moring LLP

(57) ABSTRACT

Provided is a technique that appropriately predicts the degree of influence of each risk on business indexes according to a production situation and determines risks to be managed. A storage unit stores a table that stores risk propagation model master information and risk information. A processing unit includes a risk correction unit that corrects the risk propagation model master information and the risk information for each product, using at least one of a degree of progress and a degree of pressure and a risk score calculation unit that calculates a risk score on the basis of the (Continued)

corrected risk propagation model master information and the corrected risk information. An output unit outputs the risk score for each product in each process to a screen.

9 Claims, 19 Drawing Sheets

(56) References Cited

U.S. PATENT DOCUMENTS

| | | | | |
|---|---|---|---|---|
| 2007/0016542 | A1* | 1/2007 | Rosauer | G06N 5/022 |
| | | | | 706/21 |
| 2010/0145773 | A1* | 6/2010 | Desai | G06Q 10/067 |
| | | | | 705/7.29 |
| 2011/0066454 | A1* | 3/2011 | Rosauer | G06Q 10/067 |
| | | | | 705/4 |
| 2011/0251868 | A1* | 10/2011 | Mikurak | G06Q 30/0202 |
| | | | | 705/7.25 |
| 2012/0016714 | A1* | 1/2012 | Apte | G06Q 10/06 |
| | | | | 705/7.28 |
| 2012/0072247 | A1* | 3/2012 | Rosauer | G06Q 10/04 |
| | | | | 705/4 |
| 2012/0143631 | A1* | 6/2012 | Ziade | G06Q 40/08 |
| | | | | 705/4 |
| 2012/0259752 | A1* | 10/2012 | Agee | G06Q 40/00 |
| | | | | 705/35 |
| 2012/0296806 | A1* | 11/2012 | Abrahams | G06Q 40/025 |
| | | | | 705/38 |
| 2013/0179314 | A1* | 7/2013 | Stoke | G06Q 40/08 |
| | | | | 705/31 |
| 2014/0136277 | A1* | 5/2014 | Bassin | G06F 11/008 |
| | | | | 705/7.28 |
| 2014/0218389 | A1* | 8/2014 | Bennett | G06F 21/577 |
| | | | | 345/593 |
| 2015/0081592 | A1* | 3/2015 | Stubbs | G06Q 40/06 |
| | | | | 705/36 R |
| 2015/0324715 | A1* | 11/2015 | Nelson | G06Q 10/06 |
| | | | | 705/7.28 |
| 2016/0180264 | A1* | 6/2016 | Beck | G06Q 10/0635 |
| | | | | 705/7.28 |
| 2018/0069882 | A1* | 3/2018 | Vescio | G06Q 10/0635 |
| 2019/0188616 | A1* | 6/2019 | Urban | G06Q 10/0875 |

OTHER PUBLICATIONS

Hindi-language Office Action issued in Indian Application No. 201814015354 dated Aug. 26, 2020 with English translation (six (6) pages).

* cited by examiner

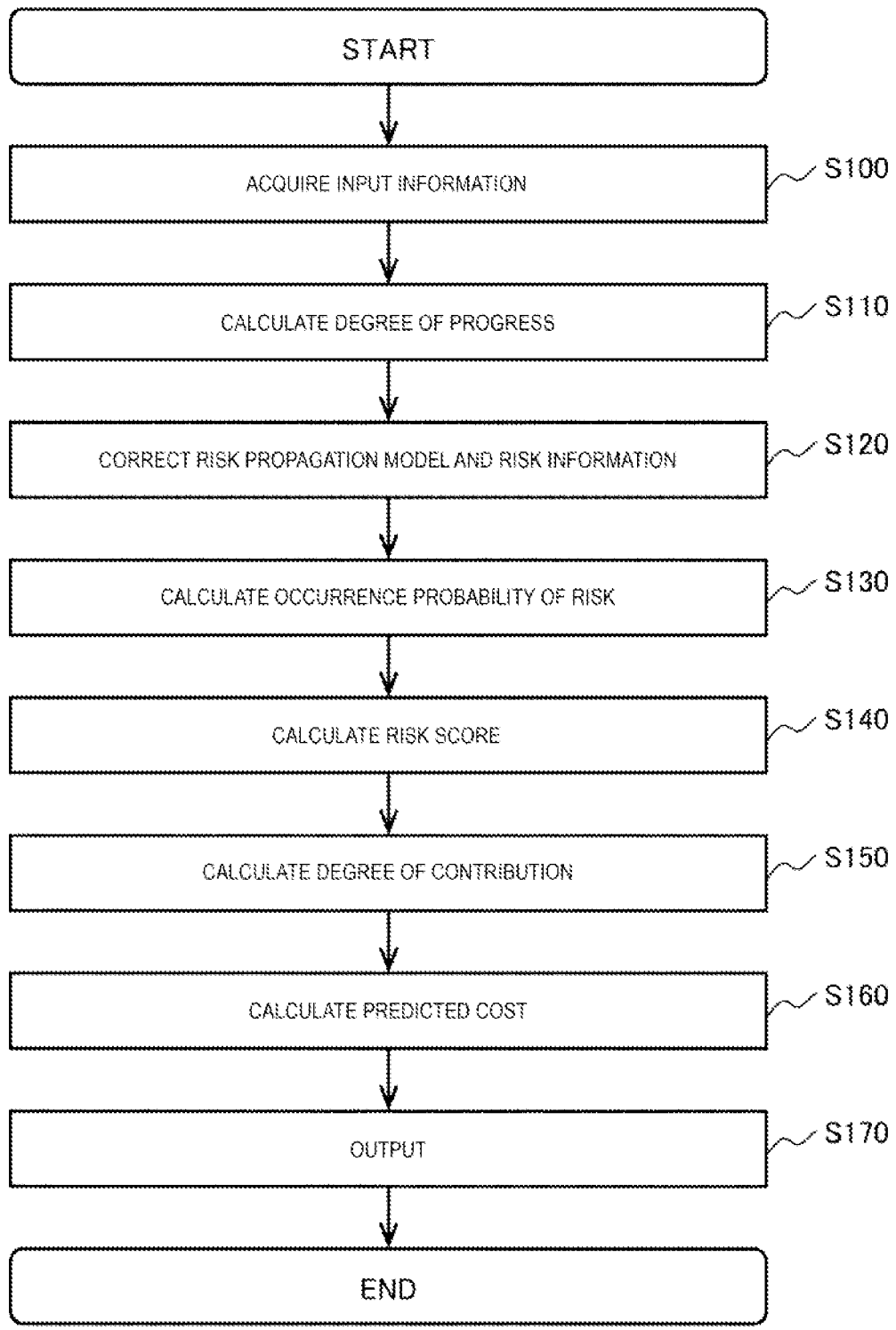

[Fig. 2]
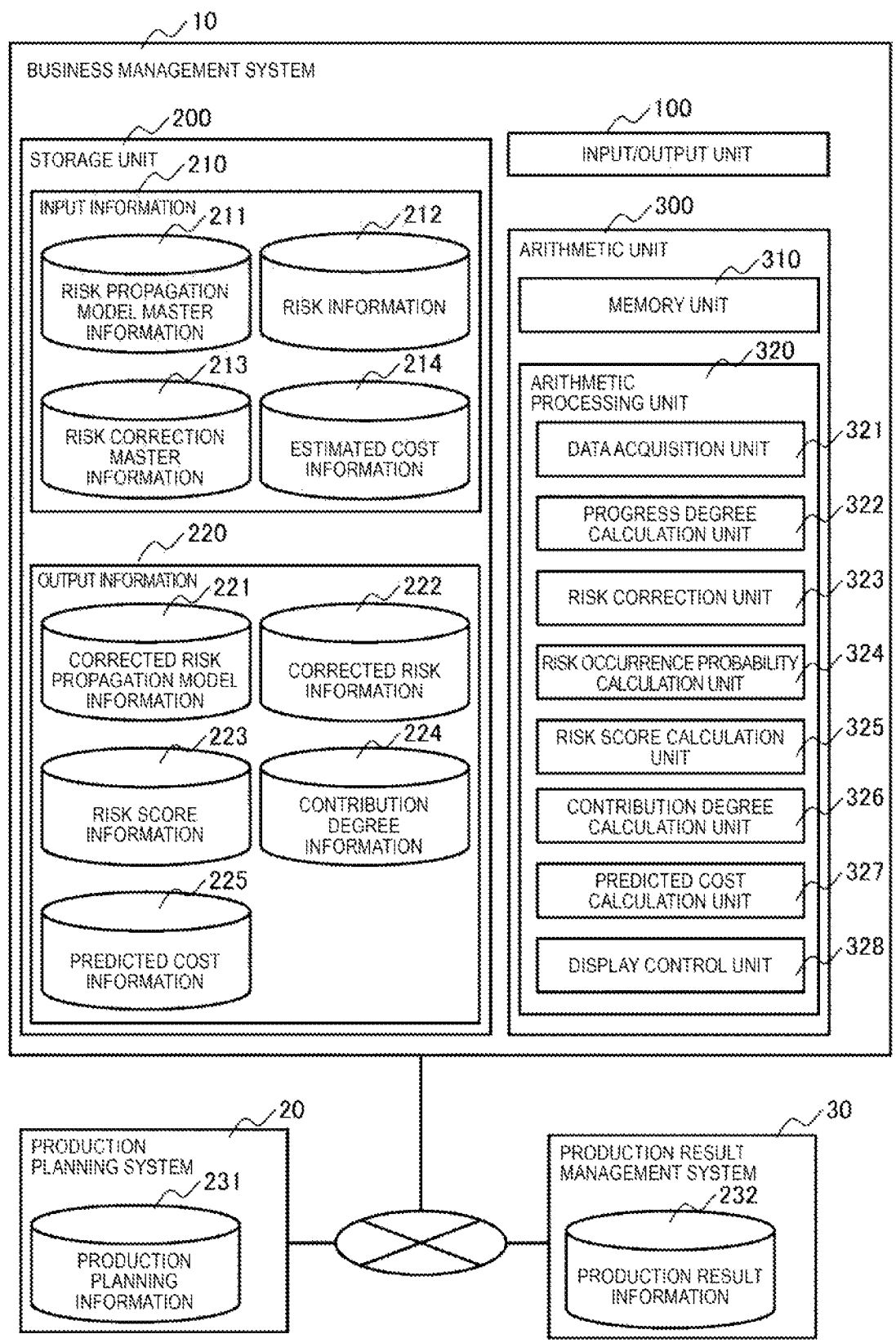

[Fig. 3]
| RISK ID | PROCESS ID | PARENT RISK ID | PARENT RISK OCCURRENCE SITUATION | CONDITIONAL OCCURRENCE PROBABILITY |
|---|---|---|---|---|
| R-01 | P-01 | — | — | 0.5 |
| R-02 | P-02 | R-01 | OCCURRED | 0.4 |
| R-02 | P-02 | R-01 | NOT OCCURRED | 0.2 |
| R-03 | P-03 | R-02 | OCCURRED | 0.4 |
| R-03 | P-03 | R-02 | NOT OCCURRED | 0.1 |
| R-04 | P-04 | R-01 | OCCURRED | 0.6 |
| R-04 | P-04 | R-01 | NOT OCCURRED | 0.4 |
211
[Fig. 4]
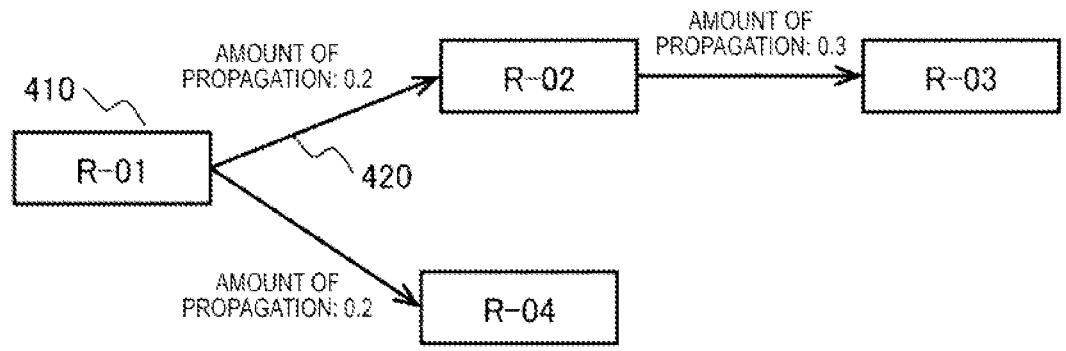
[Fig. 5]
| PRODUCT ID | RISK ID | OCCURRENCE SITUATION | DEGREE OF INFLUENCE |
|---|---|---|---|
| A-01 | R-01 | NOT OCCURRED | 1000 |
| A-01 | R-02 | NOT OCCURRED | 1500 |
| A-01 | R-03 | NOT OCCURRED | 1500 |
| A-01 | R-04 | OCCURRED | 1000 |
212

| RISK ID | REFERENCE RISK | DEGREE OF PROGRESS | INFLUENCE DEGREE CORRECTION EXPRESSION | NATURAL OCCURRENCE PROBABILITY CORRECTION EXPRESSION | PROPAGATION AMOUNT CORRECTION EXPRESSION |
|---|---|---|---|---|---|
| R-01 | ITSELF | [0,0.5) | 0 | 0 | 0 |
| R-01 | ITSELF | [0.5,0.8) | +30% | −0.15 | 0 |
| R-01 | ITSELF | [0.8,1] | +50% | −0.2 | 0 |
| R-02 | PARENT (R-01) | [0,0.5) | 0 | 0 | 0 |
| R-02 | PARENT (R-01) | [0.5,0.8) | 0 | 0 | +0.05 |
| R-02 | PARENT (R-01) | [0.8,1] | 0 | 0 | +0.15 |
| R-02 | ITSELF | [0,0.5) | 0 | 0 | 0 |
| R-02 | ITSELF | [0.5,0.8) | +20% | −0.15 | 0 |
| R-02 | ITSELF | [0.8,1] | +30% | −0.2 | 0 |
| ⋮ | ⋮ | ⋮ | ⋮ | ⋮ | ⋮ |

| PRODUCT ID | MONTH | ESTIMATED COST [k¥] | RESERVE CAPACITY FOR RISKS [k¥] |
|---|---|---|---|
| A-01 | JANUARY | 2000 | |
| A-01 | FEBRUARY | 1500 | |
| A-01 | MARCH | 500 | 285 |
| A-01 | TOTAL | 4000 | 1735 |
| ⋮ | ⋮ | ⋮ | ⋮ |
| A-02 | TOTAL | 3500 | 1400 |
| A-03 | TOTAL | 6000 | 1200 |
| A-04 | TOTAL | 5000 | 1800 |

[Fig. 8]

| PRODUCT ID | PROCESS ID | SCHEDULED WORK TIME [h] | SCHEDULED START DATE | SCHEDULED END DATE |
|---|---|---|---|---|
| A-01 | P-01 | 120 | 1/5 | 2/15 |
| A-01 | P-02 | 100 | 1/15 | 2/28 |
| A-01 | P-03 | 150 | 3/1 | 3/15 |
| A-01 | P-04 | 200 | 1/15 | 2/15 |

[Fig. 9]

| PRODUCT ID | PROCESS ID | ACTUAL WORK TIME [h] | ACTUAL START DATE | ACTUAL END DATE |
|---|---|---|---|---|
| A-01 | P-01 | 100 | 1/5 | NO RESULT |
| A-01 | P-02 | 60 | 1/15 | NO RESULT |
| A-01 | P-03 | 0 | NO RESULT | NO RESULT |
| A-01 | P-04 | 100 | 1/15 | NO RESULT |

[Fig. 10]

| PRODUCT ID | RISK ID | PARENT RISK OCCURRENCE SITUATION | CONDITIONAL OCCURRENCE PROBABILITY | | | |
|---|---|---|---|---|---|---|
| | | | INITIAL VALUE | PARENT RISK PROGRESS DEGREE EFFECT | RISK PROGRESS DEGREE EFFECT | FINAL VALUE |
| A-01 | R-01 | — | 0.5 | 0 | -0.2 | 0.3 |
| A-01 | R-02 | OCCURRED | 0.4 | 0.15 | -0.15 | 0.4 |
| A-01 | R-02 | NOT OCCURRED | 0.2 | 0 | -0.15 | 0.05 |
| A-01 | R-03 | OCCURRED | 0.4 | 0.1 | 0 | 0.5 |
| A-01 | R-03 | NOT OCCURRED | 0.1 | 0 | 0 | 0.1 |
| A-01 | R-04 | OCCURRED | 1 | 0 | 0 | 1 |
| A-01 | R-04 | NOT OCCURRED | 1 | 0 | 0 | 1 |

| PRODUCT ID | RISK ID | DEGREE OF INFLUENCE | | |
|---|---|---|---|---|
| | | INITIAL VALUE | RISK PROGRESS DEGREE EFFECT | FINAL VALUE |
| A-01 | R-01 | 1000 | 500 | 1500 |
| A-01 | R-02 | 1500 | 300 | 1800 |
| A-01 | R-03 | 1500 | 0 | 1500 |
| A-01 | R-04 | 1000 | 0 | 1000 |

| PRODUCT ID | RISK ID | OCCURRENCE PROBABILITY | DEGREE OF INFLUENCE | EXPECTED VALUE OF DEGREE OF INFLUENCE | RISK SCORE | EXPECTED VALUE OF RISK SCORE |
|---|---|---|---|---|---|---|
| A-01 | R-01 | 0.3 | 1500 | 450 | 2340 | 702 |
| A-01 | R-02 | 0.16 | 1800 | 288 | 2400 | 384 |
| A-01 | R-03 | 0.16 | 1500 | 240 | 1500 | 240 |
| A-01 | R-04 | 1 | 1000 | 1000 | 1000 | 1000 |

| PRODUCT ID | RISK ID | DEGREE OF CONTRIBUTION OF DEGREE OF PROGRESS |
|---|---|---|
| A-01 | R-01 | 7 |
| A-01 | R-02 | |
| A-01 | R-03 | |
| A-01 | R-04 | 0 |

[Fig. 14]

| PRODUCT ID | MONTH | ESTIMATED COST [k¥] | EXPECTED VALUE OF DEGREE OF INFLUENCE | RESERVE CAPACITY FOR RISKS [k¥] | COST INCREMENT [k¥] | PREDICTED COST [k¥] |
|---|---|---|---|---|---|---|
| A-01 | JANUARY | 2000 | 869 | | | |
| A-01 | FEBRUARY | 1500 | 869 | | | |
| A-01 | MARCH | 500 | 240 | 285 | -45 | 455 |
| A-01 | TOTAL | 4000 | 1978 | 1735 | 243 | 4243 |
| ⋮ | ⋮ | ⋮ | ⋮ | ⋮ | ⋮ | ⋮ |
| A-02 | TOTAL | 3500 | 1600 | 1400 | 200 | 3700 |
| A-03 | TOTAL | 6000 | 1400 | 1200 | 200 | 6200 |
| A-04 | TOTAL | 5000 | 1950 | 1800 | 150 | 5150 |

| PRODUCT ID | PROCESS ID | DEGREE OF PROGRESS |
|---|---|---|
| A-01 | P-01 | 0.83 |
| A-01 | P-02 | 0.6 |
| A-01 | P-03 | 0 |
| A-01 | P-04 | 0.5 |

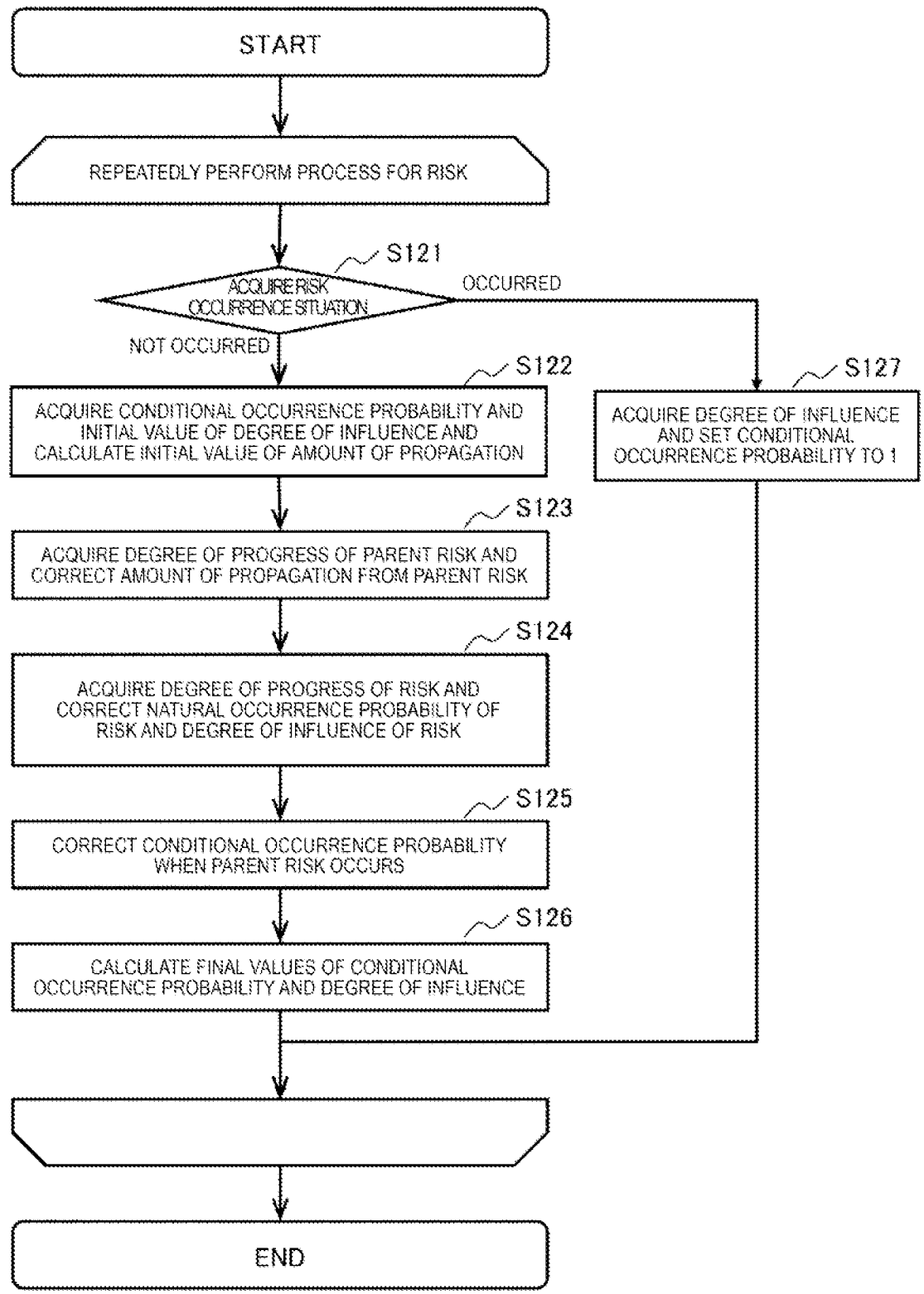
[Fig. 16]

| PRODUCT ID | RISK ID | PARENT RISK OCCURRENCE SITUATION | CONDITIONAL OCCURRENCE PROBABILITY ||||
|---|---|---|---|---|---|---|
| | | | INITIAL VALUE | PARENT RISK PROGRESS DEGREE EFFECT | RISK PROGRESS DEGREE EFFECT | FINAL VALUE |
| A-01 | R-02 | OCCURRED | 0.4 | | | |
| A-01 | R-02 | NOT OCCURRED | 0.2 | | | |

2212

| PRODUCT ID | RISK ID | PARENT RISK OCCURRENCE SITUATION | CONDITIONAL OCCURRENCE PROBABILITY ||||
|---|---|---|---|---|---|---|
| | | | INITIAL VALUE | PARENT RISK PROGRESS DEGREE EFFECT | RISK PROGRESS DEGREE EFFECT | FINAL VALUE |
| A-01 | R-02 | OCCURRED | 0.4 | | | |
| A-01 | R-02 | NOT OCCURRED | 0.2 | 0 | -0.15 | |

2213

| PRODUCT ID | RISK ID | PARENT RISK OCCURRENCE SITUATION | CONDITIONAL OCCURRENCE PROBABILITY ||||
|---|---|---|---|---|---|---|
| | | | INITIAL VALUE | PARENT RISK PROGRESS DEGREE EFFECT | RISK PROGRESS DEGREE EFFECT | FINAL VALUE |
| A-01 | R-02 | OCCURRED | 0.4 | 0.15 | -0.15 | |
| A-01 | R-02 | NOT OCCURRED | 0.2 | 0 | -0.15 | |

2214

| PRODUCT ID | RISK ID | PARENT RISK OCCURRENCE SITUATION | CONDITIONAL OCCURRENCE PROBABILITY ||||
|---|---|---|---|---|---|---|
| | | | INITIAL VALUE | PARENT RISK PROGRESS DEGREE EFFECT | RISK PROGRESS DEGREE EFFECT | FINAL VALUE |
| A-01 | R-02 | OCCURRED | 0.4 | 0.15 | -0.15 | 0.4 |
| A-01 | R-02 | NOT OCCURRED | 0.2 | 0 | -0.15 | 0.05 |

[Fig. 18]

| PRODUCT ID | RISK ID | PARENT RISK ID | AMOUNT OF PROPAGATION | | |
|---|---|---|---|---|---|
| | | | INITIAL VALUE | PARENT RISK PROGRESS DEGREE EFFECT | FINAL VALUE |
| A-01 | R-02 | R-01 | 0.2 | 0.15 | 0.35 |
| A-01 | R-03 | R-02 | 0.3 | 0.1 | 0.4 |
| A-01 | R-04 | R-01 | 0 | 0 | 0 |

[Fig. 19]

| PRODUCT ID | RISK ID | OCCURRENCE PROBABILITY |
|---|---|---|
| A-01 | R-01 | 0.3 |
| A-01 | R-02 | |
| A-01 | R-03 | |
| A-01 | R-04 | |

470

| PRODUCT ID | RISK ID | OCCURRENCE PROBABILITY |
|---|---|---|
| A-01 | R-01 | 0.3 |
| A-01 | R-02 | 0.16 |
| A-01 | R-03 | |
| A-01 | R-04 | |

471

| PRODUCT ID | RISK ID | OCCURRENCE PROBABILITY |
|---|---|---|
| A-01 | R-01 | 0.3 |
| A-01 | R-02 | 0.16 |
| A-01 | R-03 | 0.16 |
| A-01 | R-04 | 1 |

| PRODUCT ID | RISK ID | OCCURRENCE PROBABILITY | DEGREE OF INFLUENCE | EXPECTED VALUE OF DEGREE OF INFLUENCE | RISK SCORE | EXPECTED VALUE OF RISK SCORE |
|---|---|---|---|---|---|---|
| A-01 | R-01 | 0.3 | 1500 | 450 | | |
| A-01 | R-02 | 0.16 | 1800 | 288 | | |
| A-01 | R-03 | 0.16 | 1500 | 240 | 1500 | 240 |
| A-01 | R-04 | 1 | 1000 | 1000 | 1000 | 1000 |

2231

| PRODUCT ID | RISK ID | OCCURRENCE PROBABILITY | DEGREE OF INFLUENCE | EXPECTED VALUE OF DEGREE OF INFLUENCE | RISK SCORE | EXPECTED VALUE OF RISK SCORE |
|---|---|---|---|---|---|---|
| A-01 | R-01 | 0.3 | 1500 | 450 | | |
| A-01 | R-02 | 0.16 | 1800 | 288 | 2400 | 384 |
| A-01 | R-03 | 0.16 | 1500 | 240 | 1500 | 240 |
| A-01 | R-04 | 1 | 1000 | 1000 | 1000 | 1000 |

| PRODUCT ID | RISK ID | PARENT RISK OCCURRENCE SITUATION | CONDITIONAL OCCURRENCE PROBABILITY | | | |
|---|---|---|---|---|---|---|
| | | | INITIAL VALUE | PARENT RISK PROGRESS DEGREE EFFECT | RISK PROGRESS DEGREE EFFECT | FINAL VALUE |
| A-01 | R-01 | — | 0.5 | 0 | 0 | 0.5 |
| A-01 | R-02 | OCCURRED | 0.4 | 0 | 0 | 0.4 |
| A-01 | R-02 | NOT OCCURRED | 0.2 | 0 | 0 | 0.2 |
| A-01 | R-03 | OCCURRED | 0.4 | 0 | 0 | 0.4 |
| A-01 | R-03 | NOT OCCURRED | 0.1 | 0 | 0 | 0.1 |
| A-01 | R-04 | OCCURRED | 1 | 0 | 0 | 1 |
| A-01 | R-04 | NOT OCCURRED | 1 | 0 | 0 | 1 |

[Fig. 22]

| PRODUCT ID | RISK ID | PARENT RISK ID | AMOUNT OF PROPAGATION | | |
|---|---|---|---|---|---|
| | | | INITIAL VALUE | PARENT RISK PROGRESS DEGREE EFFECT | FINAL VALUE |
| A-01 | R-02 | R-01 | 0.2 | 0 | 0.2 |
| A-01 | R-03 | R-02 | 0.3 | 0 | 0.3 |
| A-01 | R-04 | R-01 | 0 | 0 | 0 |

[Fig. 23]

| PRODUCT ID | RISK ID | DEGREE OF INFLUENCE | | |
|---|---|---|---|---|
| | | INITIAL VALUE | RISK PROGRESS DEGREE EFFECT | FINAL VALUE |
| A-01 | R-01 | 1000 | 0 | 1000 |
| A-01 | R-02 | 1500 | 0 | 1500 |
| A-01 | R-03 | 1500 | 0 | 1500 |
| A-01 | R-04 | 1000 | 0 | 1000 |

[Fig. 24]

| PRODUCT ID | RISK ID | OCCURRENCE PROBABILITY |
|---|---|---|
| A-01 | R-01 | 0.5 |
| A-01 | R-02 | |
| A-01 | R-03 | |
| A-01 | R-04 | 1 |

[Fig. 25]

| PRODUCT ID | RISK ID | OCCURRENCE PROBABILITY | DEGREE OF INFLUENCE | EXPECTED VALUE OF DEGREE OF INFLUENCE | RISK SCORE | EXPECTED VALUE OF RISK SCORE |
|---|---|---|---|---|---|---|
| A-01 | R-01 | 0.5 | 1000 | 500 | 1390 | 695 |
| A-01 | R-02 | 0.3 | 1500 | 390 | 1950 | 585 |
| A-01 | R-03 | 0.19 | 1500 | 225 | 1500 | 285 |
| A-01 | R-04 | 1 | 1000 | 1000 | 1000 | 1000 |

[Fig. 26]

| PRODUCT ID | RISK ID | EXPECTED VALUE OF RISK SCORE | EXPECTED VALUE OF RISK SCORE (WITHOUT CORRECTION BASED ON DEGREE OF PROGRESS) | DEGREE OF CONTRIBUTION OF DEGREE OF PROGRESS |
|---|---|---|---|---|
| A-01 | R-01 | 702 | 695 | 7 |
| A-01 | R-02 | 384 | 585 | -201 |
| A-01 | R-03 | 240 | 285 | -45 |
| A-01 | R-04 | 1000 | 1000 | 0 |

[Fig. 27]

| PRODUCT ID | MONTH | ESTIMATED COST [k¥] | EXPECTED VALUE OF DEGREE OF INFLUENCE | RESERVE CAPACITY FOR RISKS [k¥] | COST INCREMENT [k¥] | PREDICTED COST [k¥] |
|---|---|---|---|---|---|---|
| A-01 | JANUARY | 2000 | 975 | 725 | 250 | 2250 |
| A-01 | FEBRUARY | 1500 | 975 | 725 | 250 | 1750 |
| A-01 | MARCH | 500 | 285 | 285 | 0 | 500 |
| A-01 | TOTAL | 4000 | 2235 | 1735 | 500 | 4500 |
| ⋮ | ⋮ | ⋮ | ⋮ | ⋮ | ⋮ | ⋮ |
| A-02 | TOTAL | 3500 | 1800 | 1400 | 400 | 3900 |
| A-03 | TOTAL | 6000 | 1500 | 1200 | 300 | 6300 |
| A-04 | TOTAL | 5000 | 2000 | 1800 | 200 | 5200 |

[Fig. 28]
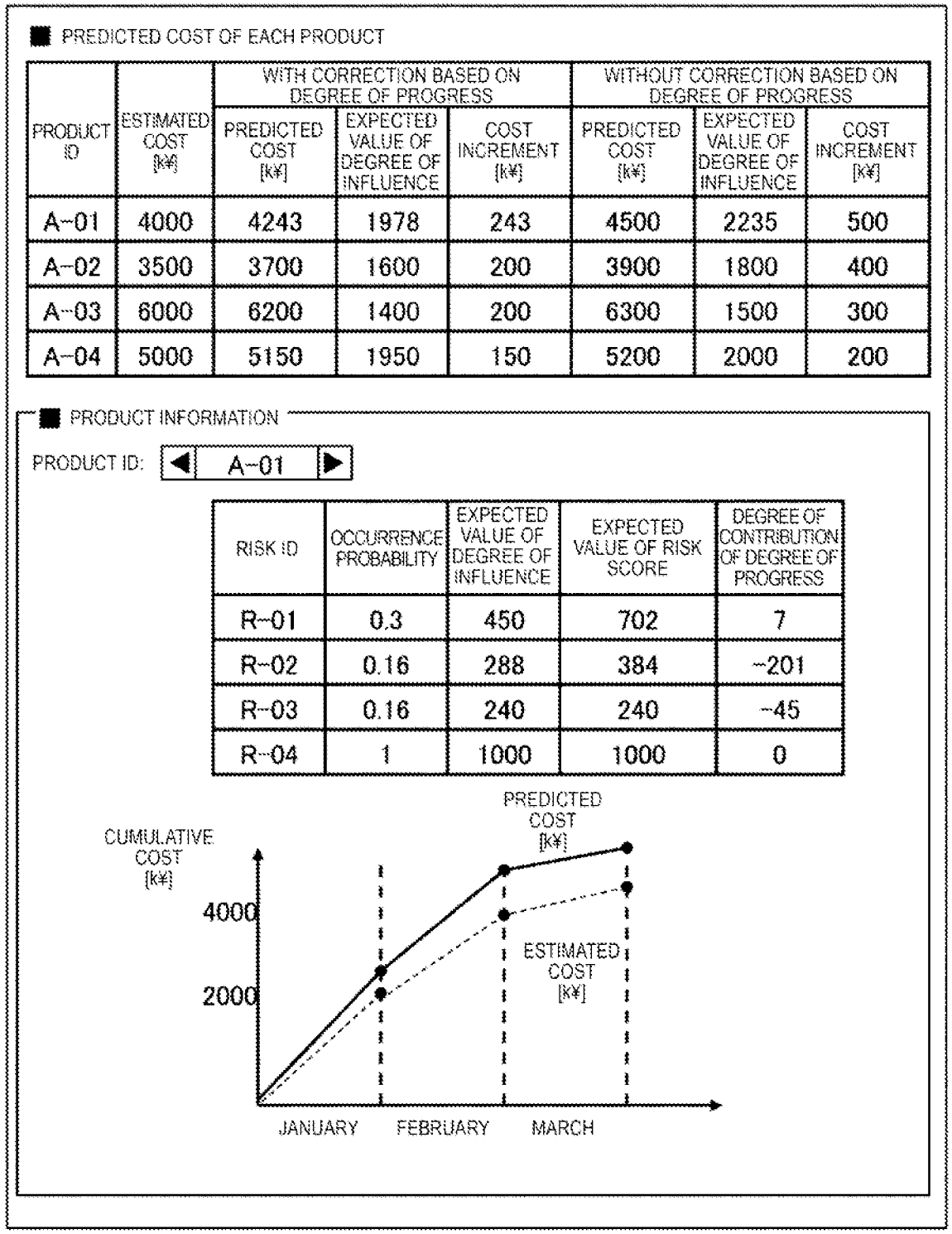

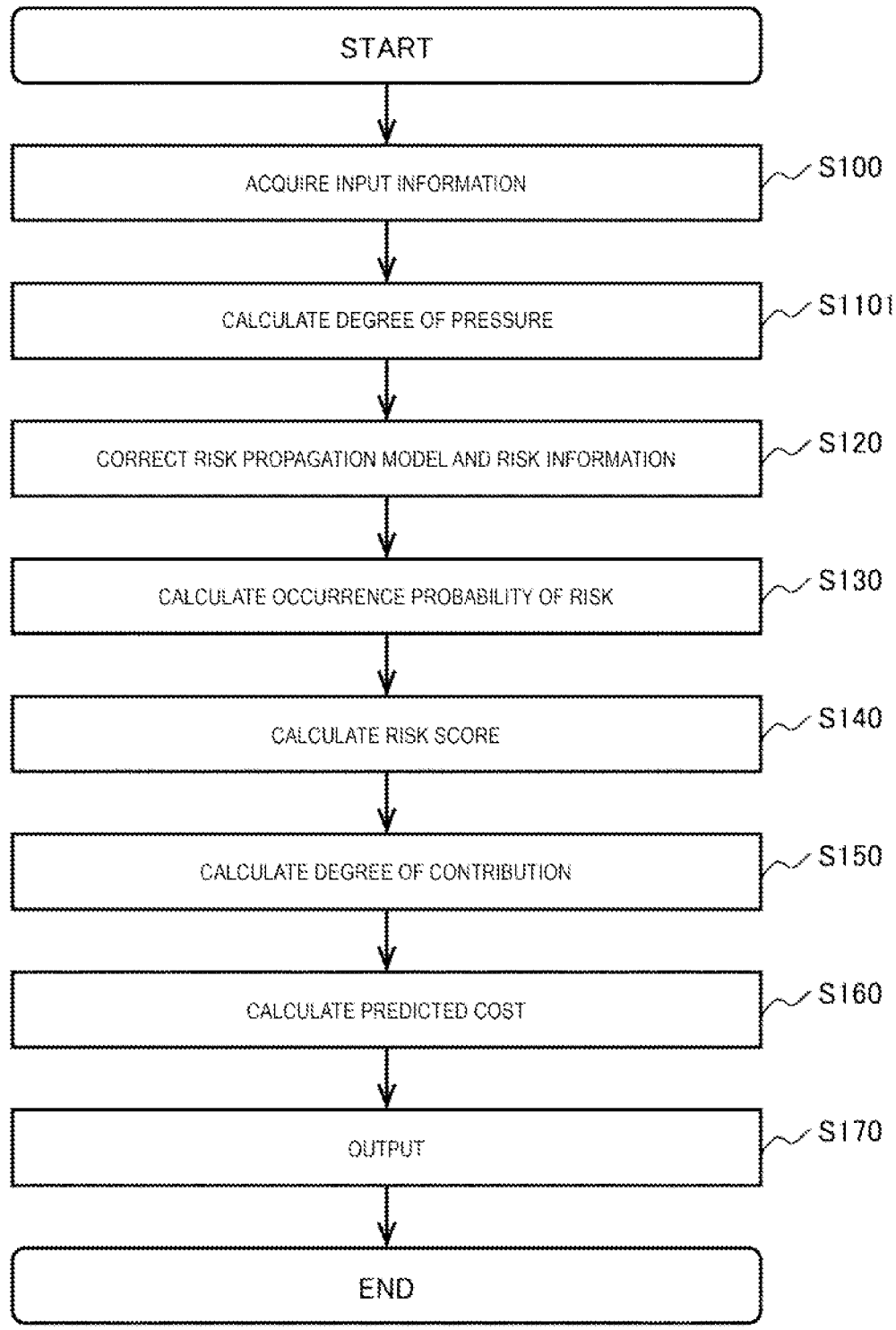
[Fig. 29]

[Fig. 30]
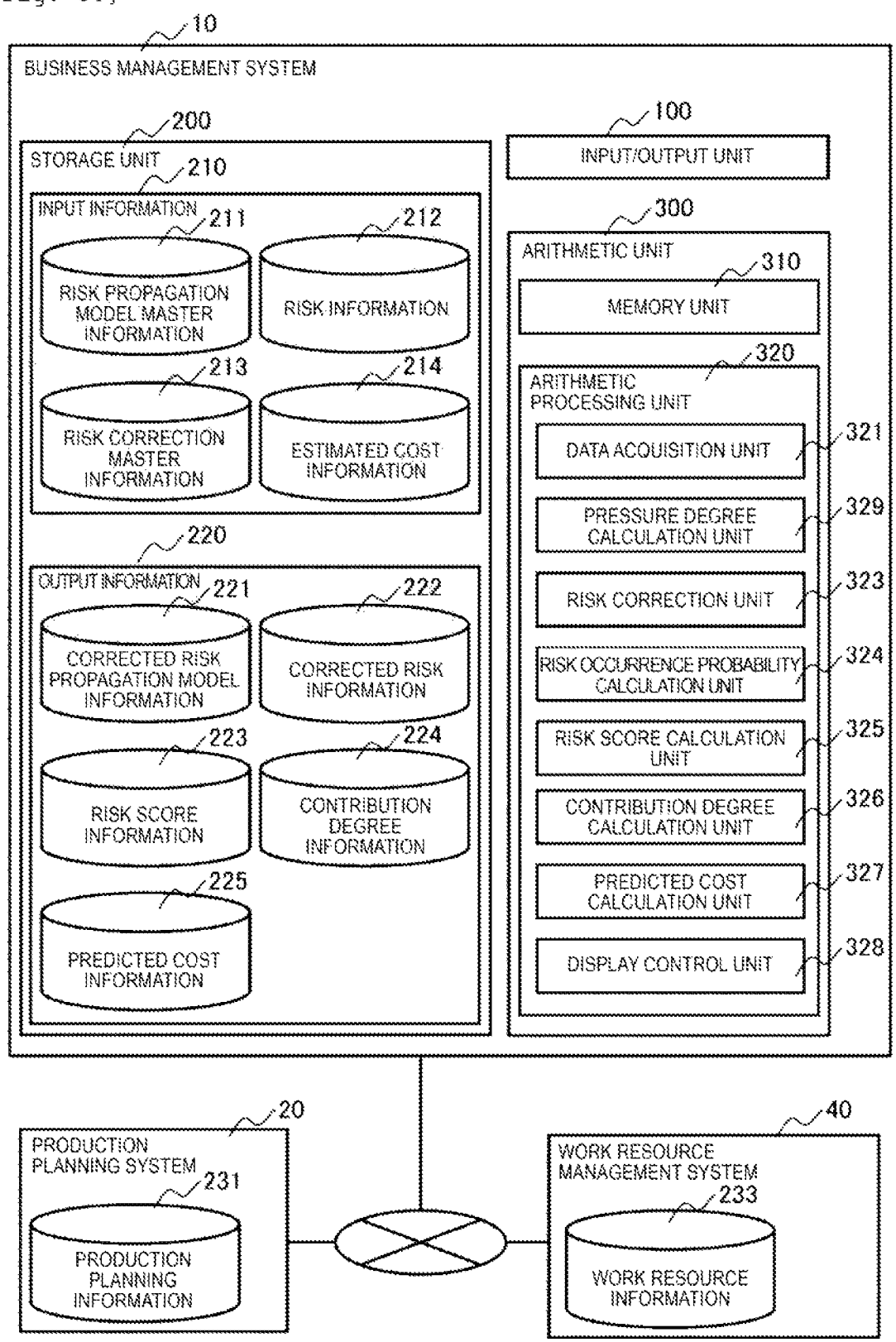

[Fig. 31]

| PRODUCT ID | PROCESS ID | SCHEDULED START DATE | SCHEDULED END DATE | WORK RESOURCE ID |
|---|---|---|---|---|
| A-01 | P-01 | 1/5 | 2/15 | M-01 |
| A-01 | P-02 | 1/15 | 2/28 | M-02 |
| A-01 | P-03 | 3/1 | 3/15 | M-03 |
| A-01 | P-04 | 1/15 | 2/15 | M-04 |

| WORK RESOURCE ID | DATE | WORKLOAD | WORK CAPACITY |
|---|---|---|---|
| M-01 | 1/5 | 70 | 80 |
| ⋮ | ⋮ | ⋮ | ⋮ |
| M-01 | 1/5 | 65 | 80 |
| ⋮ | ⋮ | ⋮ | ⋮ |

| PRODUCT ID | PROCESS ID | DEGREE OF PRESSURE |
|---|---|---|
| A-01 | P-01 | 0.83 |
| A-01 | P-02 | 0.6 |
| A-01 | P-03 | 0 |
| A-01 | P-04 | 0.5 |

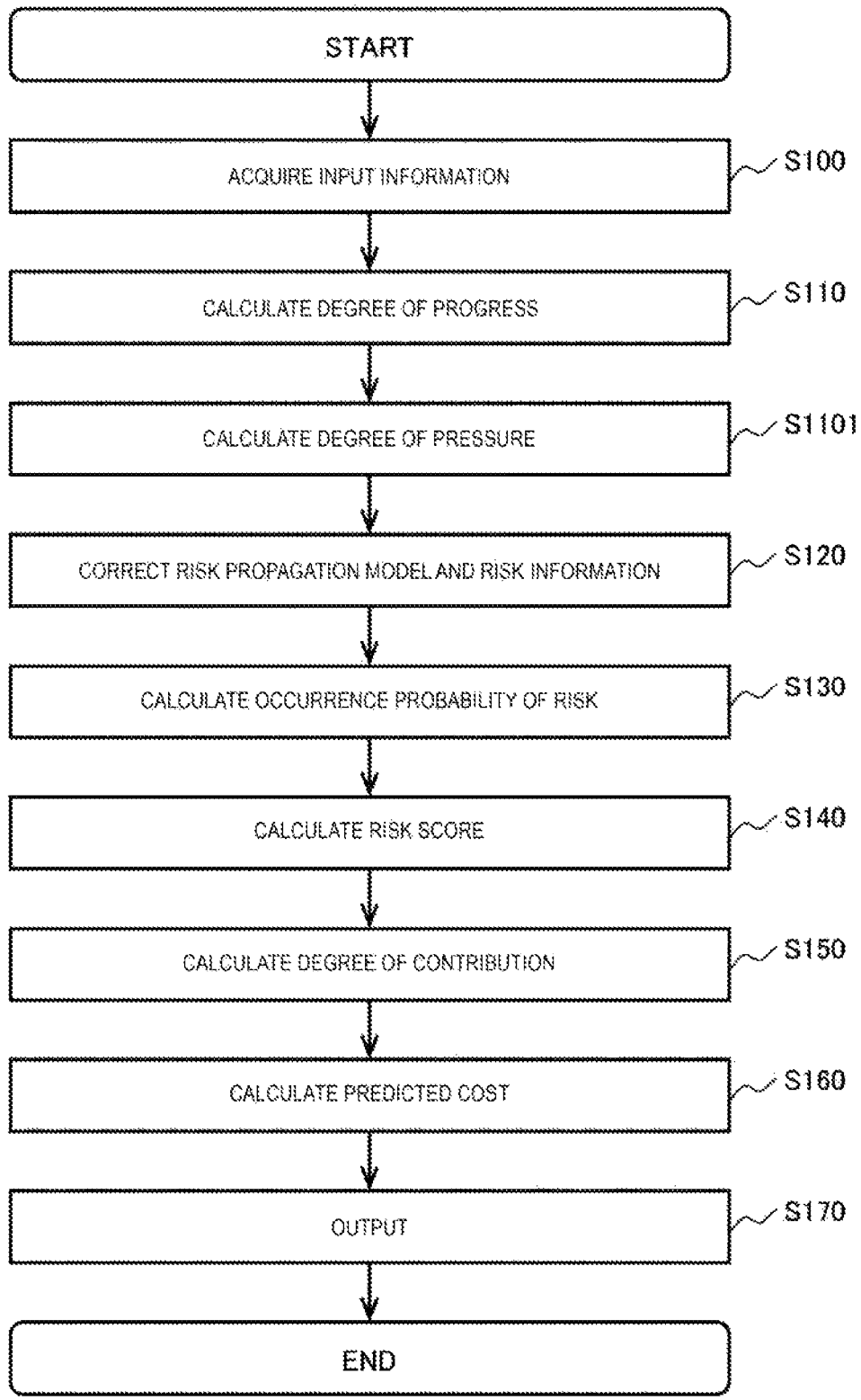
[Fig. 34]

[Fig. 35]
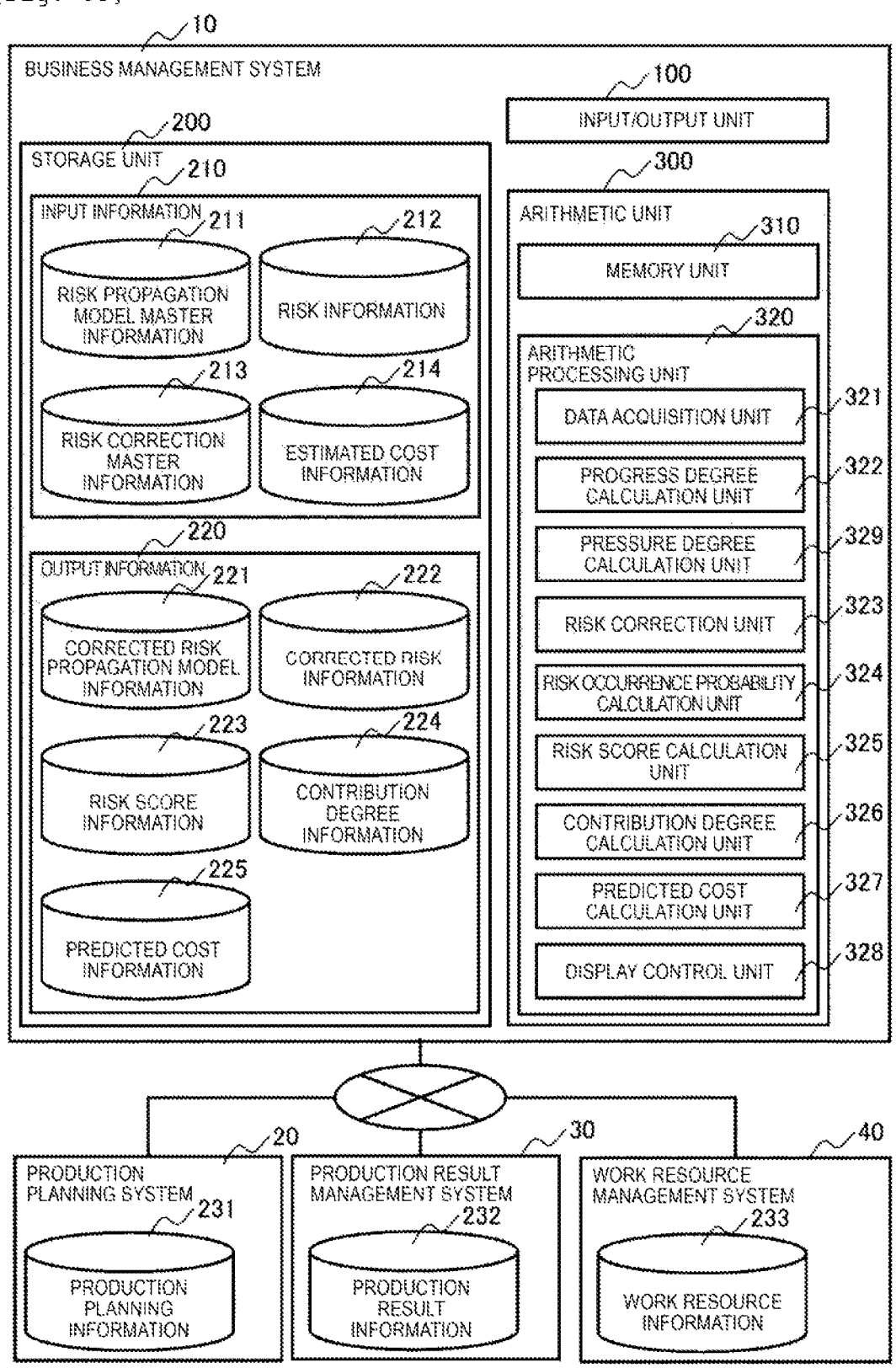

BUSINESS MANAGEMENT SYSTEM

TECHNICAL FIELD

The present invention relates to a business management system.

BACKGROUND ART

A system product, such as a control panel, includes a plurality of control panels and various units and is a make-to-order product whose configuration is designed according to the customer's order and which is manufactured, tested, and shipped.

In the management of the production cost of the make-to-order product, it is important to detect that the cost exceeds the estimated cost early and to take measures, in order to maintain the estimated cost of each product.

For example, with a change in design specifications, the design is corrected and design costs are added. As such, additional costs associated with the occurrence of various risks cause the cost to exceed the estimated cost.

Therefore, in order to detect that the cost exceeds the estimated cost, it is necessary to appropriately predict the occurrence of each risk, to appropriately estimate additional costs when the risk occurs, and to take measures to risks that have a great influence on production.

In addition, risks occur independently and have the relationship therebetween in which risks in the previous process are propagated to risks in the next process. For example, with a change in design specifications, a manufacturing process is corrected. For this reason, it is necessary to consider indirect influence caused by propagation, in addition to the direct influence of each risk.

PTL 1 discloses a method which expresses a risk propagation relationship in a network in advance and calculates the occurrence probability or the degree of indirect influence of each risk according to the occurrence situations of other risks.

CITATION LIST

Patent Literature

PTL 1: JP-A-2013-61694

SUMMARY OF INVENTION

Technical Problem

However, for example, in a case in which a risk, such as a change in design specifications, occurs in the first half of a design process, the number of items to be corrected and additional costs are less than those in a case in which a risk occurs in the second half of the design process. As such, the occurrence probability or the degree of propagation of the risk and the degree of direct influence of the risk vary depending on a production situation.

In the method disclosed in PTL 1, in a case in which the occurrence situations of other risks are the same, the occurrence probability or the degree of direct influence of the risk is constant. Therefore, PTL 1 does not consider that the occurrence probability or the degree of propagation of the risk and the degree of direct influence of the risk vary depending on a production situation.

For this reason, in the method disclosed in PTL 1, it is difficult to accurately detect whether the cost exceeds the estimated cost, to appropriately predict the degree of influence of each risk on business indexes, and to determine risks to be managed.

An object of the invention is to provide a business management system that appropriately predicts the degree of influence of each risk on business indexes according to a production situation and determines risks to be managed.

Solution to Problem

A business management system according to an aspect of the invention includes a server terminal that includes an output unit, a storage unit, and a processing unit. The storage unit stores a risk propagation model master information table that stores risk propagation model master information for managing a causal relationship between a plurality of possible risks and a risk information table that stores risk information for managing an occurrence situation of the risk and a degree of influence indicating a magnitude of influence of the risk on a business index for each product. The processing unit includes: a risk correction unit that corrects the risk propagation model master information and the risk information for each product, using at least one of a degree of progress which is an index indicating progress of each process and a degree of pressure which is an index indicating a pressure level of workload on work capacity in work resources required to produce the product; and a risk score calculation unit that calculates a risk score which is a value obtained by adding indirect influence caused by propagation of the risk to direct influence of the risk, on the basis of the corrected risk propagation model master information and the corrected risk information obtained by the risk correction unit. The output unit outputs the risk score calculated by the risk score calculation unit for each product in each process to a screen.

Advantageous Effects of Invention

According to an aspect of the invention, it is possible to appropriately predict the degree of influence of each risk on business indexes according to a production situation and to determine risks to be managed.

BRIEF DESCRIPTION OF DRAWINGS

FIG. 1 is a diagram illustrating an example of a process flow in Embodiment 1.

FIG. 2 is a block diagram illustrating the overall configuration of a system according to Embodiment 1.

FIG. 3 is a diagram illustrating an example of risk propagation model master information.

FIG. 4 is a diagram illustrating an example of the network expression of a risk propagation model.

FIG. 5 is a diagram illustrating an example of risk information.

FIG. 6 is a diagram illustrating an example of risk correction master information.

FIG. 7 is a diagram illustrating an example of estimated cost information.

FIG. 8 is a diagram illustrating an example of production planning information.

FIG. 9 is a diagram illustrating an example of production result information.

FIG. 10 is a diagram illustrating an example of corrected risk propagation model information.

FIG. 11 is a diagram illustrating an example of corrected risk information.

FIG. 12 is a diagram illustrating an example of risk score information.

FIG. 13 is a diagram illustrating an example of contribution degree information.

FIG. 14 is a diagram illustrating an example of predicted cost information.

FIG. 15 is a diagram illustrating an example of the calculation result of the degree of progress in Step S110 of the process flow illustrated in FIG. 1.

FIG. 16 is a diagram illustrating an example of a detailed process flow in Step S120 of the process flow illustrated in FIG. 1.

FIG. 17 is a diagram illustrating an example of a process of correcting a risk propagation model in Step S120 of the process flow illustrated in FIG. 1.

FIG. 18 is a diagram illustrating an example of a process of correcting the amount of propagation in Step S120 of the process flow illustrated in FIG. 1.

FIG. 19 is a diagram illustrating an example of an occurrence probability calculation process in Step S130 of the process flow illustrated in FIG. 1.

FIG. 20 is a diagram illustrating an example of a risk score calculation process in Step S140 of the process flow illustrated in FIG. 1.

FIG. 21 is a diagram illustrating an example of the corrected risk propagation model information in a case in which correction based on the degree of progress is not considered.

FIG. 22 is a diagram illustrating an example of the amount of propagation in a case in which correction based on the degree of progress is not considered.

FIG. 23 is a diagram illustrating an example of the risk information in a case in which correction based on the degree of progress is not considered.

FIG. 24 is a diagram illustrating an example of the occurrence probability calculation process in a case in which correction based on the degree of progress is not considered.

FIG. 25 is a diagram illustrating an example of risk score information in a case in which correction based on the degree of progress is not considered.

FIG. 26 is a diagram illustrating an example of the calculation result of the degree of contribution in Step S150 of the process flow illustrated in FIG. 1.

FIG. 27 is a diagram illustrating an example of predicted cost information in a case in which correction based on the degree of progress is not considered.

FIG. 28 is a diagram illustrating an example of an output screen in Embodiment 1.

FIG. 29 is a diagram illustrating an example of a process flow in Embodiment 2.

FIG. 30 is a block diagram illustrating the overall configuration of a system according to Embodiment 2.

FIG. 31 is a diagram illustrating an example of production planning information in Embodiment 2.

FIG. 32 is a diagram illustrating an example of work resource information in Embodiment 2.

FIG. 33 is a diagram illustrating an example of the calculation result of the degree of pressure in Step S1101 of the process flow illustrated in FIG. 29.

FIG. 34 is a diagram illustrating an example of a process flow in Embodiment 3.

FIG. 35 is a block diagram illustrating the overall configuration of a system according to Embodiment 3.

DESCRIPTION OF EMBODIMENTS

Hereinafter, embodiments will be described with reference to the drawings.

Embodiment 1

FIG. 1 illustrates an example of a process flow in Embodiment 1 and FIG. 2 is a functional block diagram illustrating the configuration of a system according to Embodiment 1.

In FIG. 2, a business management system 10 is an apparatus that includes a PC, such as a server or a terminal, and software installed in the PC and includes an input/output unit 100, a storage unit 200, and an arithmetic unit 300. Here, the arithmetic unit 300 is a processing unit that performs predetermined processes. In addition, the business management system 10 is connected to a production planning system 20 and a production result management system 30 through a network.

The input/output unit 100 acquires data required for the processes of the arithmetic unit 300 and displays processing results. For example, the input/output unit 100 includes an input device, such as a keyboard or a mouse, a communication device that communicates with the outside, a recording and reproduction device for a disk-type storage medium, and an output device such as a CRT or liquid crystal monitor.

The storage unit 200 has input information 210 that is used for the processes of the arithmetic unit 300 and output information 220 that stores processing results and is a storage device such as a hard disk drive or a memory. Here, each of the input information 210 and the output information 220 is stored in the form of a table in the storage unit 200.

The input information 210 includes risk propagation model master information 211, risk information 212, risk correction information 213, and estimated cost information 214. These information items will be described below.

The risk propagation model master information 211 is information for managing a causal relationship between possible risks and includes, for example, a risk ID, a process ID, a parent risk ID, a parent risk occurrence situation, and a conditional occurrence probability as illustrated in FIG. 3.

The risk is an event that reduces business indexes such as cost, inventories, and cash flow. Examples of the risk include "a change in product specifications" and "repurchase of components". The process ID indicates a process in which a risk is likely to occur. For example, in the risk propagation model master information 211 illustrated in FIG. 3, a risk ID "R-01" indicates that a risk is likely to occur in a process ID "P-01".

The risks not only sporadically occur but also have the causal relationship therebetween in which a risk follows another risk. For two risks having the causal relationship therebetween, a risk corresponding to a cause is referred to as a parent risk, a risk corresponding to a result is referred to as a child risk, and the causal relationship is referred to as risk propagation from the parent risk to the child risk. The risk propagation from the parent risk to the child risk means that the occurrence probability of the child risk depends on the occurrence situation of the parent risk.

That is, the occurrence probability of the child risk is represented by conditional probability based on the occurrence situation of the parent risk (hereinafter, referred to as conditional occurrence probability). A model indicating the type of risk that is likely to occur and a risk propagation relationship (a parent-child relationship and the conditional occurrence probability) is referred to as a risk propagation model.

The value of the conditional occurrence probability of the risk propagation model is corrected according to the production progress situation of each product, which will be described below. In Embodiment 1, the risk propagation model master information 211 (FIG. 3) common to a plurality of products is used as an initial value.

As can be seen from the risk propagation model master information 211 illustrated in FIG. 3, for example, the parent risk of a risk ID "R-02" is a risk ID "R-01" and the conditional occurrence probability of "R-02" is "0.4" in a case in which "R-01" occurs and is "0.2" in a case in which "R-01" does not occur. In FIG. 3, only one row is related to the risk ID "R-01" and the parent risk ID and the parent risk occurrence situation for the risk ID "R-01" are represented by "-", which indicates that there is no parent risk and the occurrence probability of "R-01" is not changed by the occurrence situation of other risks.

In the risk propagation model, the relationship between the parent risk and the child risk can be illustrated as a Bayesian network. FIG. 4 illustrates a network indicating the parent-and-child relationship between risks in the risk propagation model master information 211 illustrated in FIG. 3. A node 410 indicates the risk ID "R-01" and a link 420 indicates the causal relationship between the risk ID "R-01" and the risk ID "R-02".

Here, in a case in which the parent risk does not occur or in a case in which there is no parent risk, the conditional occurrence probability of a risk is referred to as natural occurrence probability which is the probability that the risk will occur, without being caused by other risks.

An increase in the occurrence probability that the child risk will occur due to the occurrence of the parent risk is referred to as the amount of propagation from the parent risk to the child risk. The amount of propagation is calculated from the difference between the conditional occurrence probability of the child risk in a case in which the parent risk occurs and the conditional occurrence probability of the child risk in a case in which the parent risk does not occur.

The amount of propagation from each parent risk to the child risk in the risk propagation model master information 211 illustrated in FIG. 3 is represented by a link in FIG. 4. For example, in FIG. 4, the amount of propagation from the parent risk "R-01" to the child risk "R-02" is "0.2", which indicates that the conditional occurrence probability of "R-02" is increased by "0.2" (from 0.2 to 0.4) with the occurrence of "R-01" in the risk propagation model master information illustrated in FIG. 3.

The structure of the risk propagation model is predetermined, considering the causal relationship between risks, or is determined by, for example, a method which learns the structure of the Bayesian network.

The risk information 212 is information for managing the occurrence situation of each risk and the degree of influence of each risk for each product and includes, for example, a product ID, a risk ID, an occurrence situation, and the degree of influence as illustrated in FIG. 5. The degree of influence means the magnitude of influence on business indexes, such as cost, inventories, and cash flow, associated with the occurrence of the risk. In Embodiment 1, the business index is cost and an increase in cost, that is, additional cost is used as the degree of influence.

As can be seen from the risk information 212 illustrated in FIG. 5, for example, for a product ID "A-01", the risk ID "R-01" has not occurred and the degree of influence (additional cost) in a case in which the risk ID "R-01" has occurred is "1000".

The risk correction master information 213 is information for correcting the risk propagation model master information 211 or the risk information 212 for each product according to the degree of progress of the process in which each risk is likely to occur. The degree of progress of the process is an index indicating the progress level of the process. A detailed method for calculating the degree of progress will be described below. In addition, for simplicity, hereinafter, the degree of progress of the process in which each risk is likely to occur is referred to as the degree of progress of the risk.

As illustrated in FIG. 6, the risk correction master information 213 includes, for example, a risk ID, a reference risk, the degree of progress, an influence degree correction expression, a natural occurrence probability correction expression, and a propagation amount correction expression.

In Embodiment 1, in the following description, it is assumed that the degree of influence and the natural occurrence probability change depending on the degree of progress of the risk and the amount of propagation (from the parent risk) changes depending on the degree of progress of the parent risk. In FIG. 6, a row in which the reference risk is "itself" is information for performing correction according to the degree of progress of the risk and a row in which the reference risk is "parent (parent risk ID)" is information for performing correction according to the degree of progress of the parent risk. In addition, it is assumed that the parent risk ID is matched with the risk propagation model master information 211 illustrated in FIG. 3.

As can be seen from the risk correction master information 213 illustrated in FIG. 6, for example, the amount of propagation from the parent risk to the risk ID "R-02" is increased by "0.15" in a case in which the degree of progress of a parent risk ID "R-01" is "equal to or greater than 0.8 and equal to or less than 1 ([0.8, 1])". In addition, in a case in which the degree of progress of the risk ID "R-02" is "equal to or greater than 0.5 and less than 0.8 ([0.5, 0.8))", the degree of influence is increased by 20% and the natural occurrence probability is reduced by 0.15.

The estimated cost information 214 is information for managing estimated cost for each product and includes, for example, a product ID, a month, estimated cost, and reserve capacity for risks as illustrated in FIG. 7. The estimated cost includes reserve capacity estimated considering additional cost for risks, in addition to the minimum cost required in a case in which manufacture progresses satisfactorily, and the reserve capacity is referred to as reserve capacity for risks.

As can be seen from the estimated cost information 214 illustrated in FIG. 7, for example, the estimated cost of a product with a product ID "A-01" in "January" is "2000 (k¥)" and "725 (k¥)" is reserve capacity for risks. In addition, in a row in which "total" is written in a field "month", the estimated cost and reserve capacity for risks in each month indicate the total estimated cost and the total reserve capacity for risks for the entire period, respectively. For the product ID "A-01", "4000 (k¥)" obtained by adding up the estimated cost for the period from January to March is the total estimated cost and "1735 (k¥)" obtained by adding up reserve capacity for risks is the total reserve capacity for risks. In Embodiment 1, the cost is managed monthly. However, the cost may be managed daily or quarterly, or only the total cost may be managed.

In addition to the above-mentioned input information 210, the business management system 10 acquires production planning information 231 and production result information 232 from the production planning system 20 and the production result management system 30, respectively.

The production planning information 231 is information for managing production plans for each product and each process and includes, for example, a product ID, a process ID, a scheduled work time, a scheduled start date, and a scheduled end date as illustrated in FIG. 8. As can be seen from the production planning information 231 illustrated in FIG. 8, for example, work corresponding to a product ID "A-01" and a process ID "P-01" is scheduled to be performed for a work time "120 (h)", to start on "1/5", and to end on "2/15".

The production result information 232 is information for managing the production results of each product and each process and includes, for example, a product ID, a process ID, an actual work time, an actual start date, and an actual end date as illustrated in FIG. 9. As can be seen from the production result information 232 illustrated in FIG. 9, for example, work corresponding to a product ID "A-01" and a process ID "P-01" starts on "1/5", is performed for "100 (h)", and has not ended.

In addition, the output information 220 includes corrected risk propagation model information 221, corrected risk information 222, risk score information 223, contribution degree information 224, and predicted cost information 225, which will be described below.

The corrected risk propagation model information 221 is information for managing the risk propagation model corrected according to the degree of progress of each process. The corrected risk propagation model information 221 includes, for example, a product ID, a risk ID, a parent risk occurrence situation, and an initial value, a parent risk progress degree effect, a risk progress degree effect, and a final value of conditional occurrence probability as illustrated in FIG. 10. The parent risk progress degree effect and the risk progress degree effect of the conditional occurrence probability indicate the amounts of correction of the conditional occurrence probability according to the degrees of progress of a parent risk and a target risk.

As can be seen from FIG. 10, for example, in a case in which a parent risk occurs in a product ID "A-01", the conditional occurrence probability of a child risk ID "R-02" has an initial value of "0.4", is increased by "0.15" according to the degree of progress of the parent risk, is reduced by "0.15" according to its own degree of progress, and has a final value of "0.4".

The corrected risk information 222 is information for managing the magnitude of the influence of each risk corrected according to the degree of progress of each process and includes, for example, a product ID, a risk ID, and an initial value, a risk progress degree effect, and a final value of the degree of influence as illustrated in FIG. 11. As can be seen from the corrected risk information 222 illustrated in FIG. 11, for example, in a case in which a risk ID "R-01" occurs in a product ID "A-01", the degree of influence has an initial value of "1000", is increased by "500" according to the degree of progress, and has a final value of "1500".

The risk score information 223 is information for managing the information of a risk score which is a value obtained by adding indirect influence caused by risk propagation to the direct influence of each risk. A method for calculating the risk score will be described below.

As illustrated in FIG. 12, the risk score information 223 includes, for example, a product ID, a risk ID, occurrence probability, the degree of influence, an expected value of the degree of influence, a risk score, and an expected value of the risk score. As can be seen from the risk score information 223 illustrated in FIG. 12, for example, in a case in which a risk "R-01" occurs in a product "A-01", the degree of influence is "1500" and the risk score is "2340". These values are multiplied by "0.3" that is the occurrence probability of the risk to obtain "450" and "702" that are the expected values of the degree of influence and the risk score, respectively.

The contribution degree information 224 is information for managing the degree of contribution, which is the magnitude of the correction effect according to the degree of progress, to the expected value of each risk score. A method for calculating the degree of contribution will be described below.

As illustrated in FIG. 13, the contribution degree information 224 includes, for example, a product ID, a risk ID, and the degree of contribution of the degree of progress. As can be seen from the contribution degree information 224 illustrated in FIG. 13, for example, for a risk "R-01" that occurs in a product "A-01", the expected value of the risk score is increased by "7" according to the degree of progress.

The predicted cost information 225 is information that is used to collect a change in the expected value of the degree of influence of each risk for each product and to manage the predicted cost and includes, for example, a product ID, a month, estimated cost, an expected value of the degree of influence, reserve capacity for risks, a cost increment, and predicted cost as illustrated in FIG. 14. As can be seen from the predicted cost information 225 illustrated in FIG. 14, for example, for a product ID "A-01", in "January", the expected value of the degree of influence of each risk is "869", the reserve capacity for risks is "725(k¥)", the cost is predicted to be greater than the estimated cost by a cost increment "144" which is the difference between the expected value of the degree of influence and the reserve capacity for risks, and the predicted cost is "2144 (k¥)".

In addition, in a row in which "total" is written in the field "month", the predicted cost indicates the total predicted cost obtained by adding up the predicted cost in each month for the entire period. For the product ID "A-01", "4243 (k¥)" that is the total predicted cost from January to March is stored.

The arithmetic unit 300 acquires data required for calculation from the input/output unit 100, the input information 210 of the storage unit 200, the production planning system 20, and the production result management system 30 and outputs the processing results to the output information 220 of the storage unit 200. The arithmetic unit 300 includes an arithmetic processing unit 320 that actually performs arithmetic processing and a memory unit 310 which is an arithmetic processing work area of the arithmetic processing unit 320.

The memory unit 310 temporarily stores the data acquired from the input/output unit 100, the input information 210 of the storage unit 200, the production planning system 20, and the production result management system 30 or the results processed by the arithmetic processing unit 320.

The arithmetic processing unit 320 includes a data acquisition unit 321 that acquires data required for calculation from the input information 210, the production planning system 20, and the production result management system 30 and stores the acquired data in the memory unit 310. In addition, the arithmetic processing unit 320 includes a progress degree calculation unit 322 that calculates the degree of progress of the process in which each risk occurs from the production planning information 231 and the production result information 232.

The arithmetic processing unit 320 further includes a risk correction unit 323 that corrects the risk propagation model master information 211 and the risk information 212 for each product, on the basis of the degree of progress and the risk correction master information 213. The arithmetic processing unit 320 further includes a risk occurrence probability calculation unit 324 that calculates the occurrence probability of each risk from the corrected risk propagation model information.

The arithmetic processing unit 320 further includes a risk score calculation unit 325 that calculates a risk score and the expected value of the risk score in a case in which each risk has occurred, on the basis of the corrected risk propagation model information, the corrected risk information, and the occurrence probability of each risk. The arithmetic processing unit 320 further includes a contribution degree calculation unit 326 that calculates the degree of contribution of the degree of progress to the expected value of the risk score of each risk.

The arithmetic processing unit 320 further includes a predicted cost calculation unit 327 that predicts the cost of each product on the basis of the estimated cost information 214 and the expected value of the degree of influence of each risk. The arithmetic processing unit 320 further includes a display control unit 328 that stores each of the corrected risk propagation model information, the corrected risk information, the risk score information, the contribution degree information, and the predicted cost information stored in the memory unit 310 in the output information 220 and displays the information on the input/output unit 100.

Next, the operation of each function of the business management system 10 illustrated in FIG. 2 will be described with reference to the flowchart illustrated in FIG. 1.

First, a user, such as a production supervisor, designates a product ID to be searched for. As a method for designating a product ID, all products with data may be designated or a list of product IDs to be designated from the information of, for example, the type of product or the person in charge may be input and designated. In the description of Embodiment 1, it is assumed that four products "A-01", "A-02", "A-03", and "A-04" are designated. In addition, in a case in which a process for each product is described, particularly, a process for the product ID "A-01" will be described. However, it is assumed that the same process is also performed for the product IDs "A-02", "A-03", and "A-04".

Then, the data acquisition unit 321 acquires data required for calculation from the input information 210, the production planning system 20, and the production result management system 30 (S100). Specifically, the data acquisition unit 321 acquires the risk propagation model master information 211 and the risk correction master information 213 as information common to all products from the input information 210. In addition, the data acquisition unit 321 acquires the risk information 212 and the estimated cost information 214 as information for each product from the input information 210. Furthermore, the data acquisition unit 321 acquires the production planning information 231 from the production planning system 20. In addition, the data acquisition unit 321 acquires the production result information 232 from the production result management system 30. In the following description, it is assumed that various input information items illustrated in FIGS. 3 to 9 are acquired.

Then, the progress degree calculation unit 322 calculates the degree of progress of the process in which each risk occurs from the production planning information 231 and the production result information 232 (S110).

FIG. 15 illustrates an example the calculation result of the degree of progress. For example, for a process ID "P-01" corresponding to a product ID "A-01", the progress degree calculation unit 322 acquires the actual work time (100 h) from the production result information 232 illustrated in FIG. 9, acquires the scheduled work time (120 h) from the production planning information 231 illustrated in FIG. 8, and divides the actual work time by the scheduled work time to calculate a degree of progress of "0.83". In the following description, it is assumed that the degree of progress is calculated as illustrated in FIG. 15.

Then, the risk correction unit 323 corrects the risk propagation model master information 211 and the risk information 212 for each product on the basis of the degree of progress calculated in Step S110 and the risk correction master information 213 (S120).

The correction method for the product ID "A-01" will be described with reference to the flowchart illustrated in FIG. 16.

First, a risk occurrence situation is acquired from the risk information 212 (S121). In a case in which a target risk has occurred, the process proceeds to S127. In a case in which the target risk has not occurred, the process proceeds to S122. In the risk information 212 illustrated in FIG. 5, a risk ID "R-04" "has occurred" and the other risks "have not occurred". Therefore, in a case in which "R-04" is corrected, the process proceeds to S127. In the other cases, the process proceeds to S122.

In a case in which a risk has not occurred, the conditional occurrence probability and the initial value of the degree of influence of the risk are acquired from the risk propagation model master information 211 and the risk information 212 and the initial value of the amount of propagation is calculated from the parent risk (S122). For example, it is assumed that the degree of influence of the risk ID "R-02" is "1500" which is the initial value of the degree of influence in the risk information 212 illustrated in FIG. 5.

In the risk propagation model master information 211 illustrated in FIG. 3, the conditional occurrence probability of the risk ID "R-02" in a case in which the parent risk has occurred is "0.4" and the conditional occurrence probability of the risk ID "R-02" in a case in which the parent risk has not occurred is "0.2". It is assumed that these values are the initial values of the conditional occurrence probability of the risk as illustrated in a table 2211 of FIG. 17.

Then, for the risk whose parent risk has occurred, the difference between the calculated initial value of the conditional occurrence probability in a case in which the parent risk has occurred and the calculated initial value of the conditional occurrence probability in a case in which the parent risk has not occurred is calculated as the initial value of the amount of propagation. However, it is assumed that the process is not performed for the risk whose parent risk has not occurred.

For example, it is assumed that the difference between the conditional occurrence probability "0.4" of the risk ID "R-02" in a case in which the parent risk has occurred and the conditional occurrence probability "0.2" of the risk ID "R-02" in a case in which the parent risk has not occurred is "0.2" in the table 2211 illustrated in FIG. 17 and the initial value of the amount of propagation of the risk ID "R-02" is 0.2 as illustrated in FIG. 18. In FIG. 18, the parent risk ID is calculated with reference to the risk propagation model master information illustrated in FIG. 3.

Then, the degree of progress of the parent risk is acquired from the calculation result of the degree of progress in Step S110 and the amount of propagation is corrected on the basis of the risk correction master information 213 (S123). Here, the amount of correction of the amount of propagation based on the degree of progress of the parent risk is referred to as a parent risk progress degree effect of the amount of propagation.

For example, as can be seen from the risk propagation model master information 211 illustrated in FIG. 3, the parent risk of the risk ID "R-02" is "R-01" and the process ID in which the parent risk ID "R-01" occurs is "P-01". Therefore, the degree of progress of the risk ID "R-01" (that is, the degree of progress of the process ID "P-01") is "0.83" from the calculation result of the degree of progress illustrated in FIG. 15.

In the risk correction master information 213 illustrated in FIG. 6, as can be seen from a row corresponding to the risk ID "R-02", the reference risk "parent (R-01)", and the degree of progress "[0.8, 1]", in a case in which the degree of progress of the risk ID "R-01" is "0.83", the amount of propagation from "R-01" to "R-02" is increased by "0.15". Therefore, as illustrated in FIG. 18, the parent risk progress degree effect of the amount of propagation of the risk is "0.15".

Then, the degree of progress of a target risk is acquired from the calculation result of the degree of progress in Step S110 and the natural occurrence probability and the degree of influence of the risk are corrected on the basis of the risk correction master information 213 (S124). Here, the amounts of correction of the conditional occurrence probability and the degree of influence based on the degree of progress of the risk are referred to as a risk progress degree effect of conditional occurrence probability and a progress degree effect of the degree of influence, respectively.

For example, the process ID in which the risk ID "R-02" is "P-02" as can be seen from the risk propagation model master information 211 illustrated in FIG. 3. The degree of progress of the risk ID "R-02" (that is, the degree of progress of the process ID "P-02") is "0.6" as can be seen from the calculation result of the degree of progress illustrated in FIG. 15.

In the risk correction master information 213 illustrated in FIG. 6, as can be seen from a row corresponding to the risk ID "R-02", the reference risk "itself", and the degree of progress "[0.5, 0.8]", in a case in which the degree of progress of the risk ID "R-02" is "0.6", the degree of influence of the risk is increased by "20%" and the natural occurrence probability is reduced by "0.15". Therefore, as can be seen from FIG. 11, the risk progress degree effect of the degree of influence is "300" that is 20% of the initial value "1500" of the degree of influence of the risk. In addition, as can be seen from FIG. 17, for the table 2211 obtained in Step S123, the risk progress degree effect of the conditional occurrence probability (natural occurrence probability) of the risk ID "R-02" in a case in which the parent risk has not occurred is "−0.15" as in a table 2212.

In Embodiment 1, a change in the natural occurrence probability according to the degree of progress of the parent risk is not considered. Therefore, in the table 2212 illustrated in FIG. 17, the parent risk progress degree effect of the conditional occurrence probability (natural occurrence probability) of the risk ID "R-02" in a case in which the parent risk has not occurred is "0".

Then, the conditional occurrence probability of only the risk with a parent risk in a case in which the parent risk has occurred is corrected on the basis of the correction results of the amount of propagation and the conditional occurrence probability (natural occurrence probability) in a case in which the parent risk has not occurred calculated in Steps S123 and S124 (S125).

The amount of propagation is the difference between the natural occurrence probability and the conditional occurrence probability in a case in which the parent risk has occurred and the amount of correction of the conditional occurrence probability in a case in which the parent risk has occurred (the parent risk progress degree effect and the risk progress degree effect) is calculated as the sum of the amounts of correction of the natural occurrence probability and the amount of propagation.

Here, an example of a process of calculating the amount of correction of the conditional occurrence probability (the parent risk progress degree effect and the risk progress degree effect) in a row corresponding to the risk ID "R-02" and the parent risk occurrence situation "occurred" as in a table 2213 illustrated in FIG. 17 in a state in which the table 2212 illustrated in FIG. 17 and the parent risk progress degree effect illustrated in FIG. 18 are obtained by the process up to Step S124 will be described.

First, for the parent risk progress degree effect among the amounts of correction, the sum of the parent risk progress degree effect "0" of the conditional occurrence probability in a row corresponding to the risk ID "R-02" and the parent risk occurrence situation "not occurred" in the table 2212 illustrated in FIG. 17 and the parent risk progress degree effect "0.15" of the amount of propagation in a row corresponding to the risk ID "R-02" in FIG. 18 is calculated. Then, as can be seen from the table 2213 illustrated in FIG. 17, the parent risk progress degree effect of the conditional occurrence probability in a row corresponding to the risk ID "R-02" and the parent risk occurrence situation "occurred" is "0.15".

For the risk progress degree effect, the risk progress degree effect "−0.15" of the conditional occurrence probability in a row corresponding the risk ID "R-02" and the parent risk occurrence situation "not occurred" in the table 2212 illustrated in FIG. 17 is read. Then, as can be seen from the table 2213, the risk progress degree effect of the conditional occurrence probability in the row corresponding to the risk ID "R-02" and the parent risk occurrence situation "not occurred" is "−0.15".

Then, for the conditional occurrence probability, the degree of influence, and the amount of propagation, the sum of the initial value and the amount of correction (the parent risk progress degree effect and the risk progress degree effect) is calculated as the final value (S126).

For example, the sum of the initial value "0.4", the parent risk progress degree effect "0.15", and the risk progress degree effect "−0.15" of the conditional occurrence probability in the row corresponding to the parent risk occurrence situation "occurred" in the table 2213 illustrated in FIG. 17 is calculated and the final value is "0.4" as illustrated in the table 2214. The same calculation process as described above is performed for the row corresponding to the parent risk occurrence situation "not occurred" to obtain a final value "0.05".

For the final value of the degree of influence, similarly, the sum of the initial value and the risk progress degree effect is calculated. For example, in FIG. 11, the sum of the initial value "1500" and the risk progress degree effect "300" of the degree of influence of the risk ID "R-02" is calculated as a final value "1800".

For the final value of the amount of propagation, similarly, the sum of the initial value and the parent risk progress degree effect is calculated as the final value. For example, in FIG. 18, for the amount of propagation of the risk ID "R-02" from the parent risk ID "R-01", the sum of an initial value "0.2" and a parent risk progress degree effect "0.15" is calculated as a final value "0.35".

The above-mentioned Steps S122 to S126 are repeatedly performed for the risks "R-01", "R-02", and "R-03" which have not occurred to obtain the rows in which the risk ID is "R-01", "R-02", and "R-03" in the corrected risk propagation model information 221 (the correction result of the conditional occurrence probability) illustrated in FIG. 10, the corrected risk information 222 (the correction result of the degree of influence) illustrated in FIG. 11, and the correction result of the amount of propagation illustrated in FIG. 18.

In the corrected risk propagation model information 221 illustrated in FIG. 10, the conditional occurrence probability of the risk without the parent risk is calculated by the same method as the conditional occurrence probability of the risk with the parent risk in a case in which the parent risk has not occurred in the above-mentioned Steps S122, S124, and S126.

In a case in which a risk has occurred in Step S121, the degree of influence of the risk is acquired from the risk information 212 and the conditional occurrence probability of the risk is set to 1 (S127).

For example, in the risk information 212 illustrated in FIG. 5, the risk ID "R-04" has occurred and the degree of influence is "1000". Here, since the risk has occurred, the degree of influence does not change depending on the degree of progress. Therefore, as illustrated in the corrected risk information 222 of FIG. 11, the risk progress degree effect of the degree of influence is "0" and the final value is "1000" that is the same as the initial value.

As can be seen from the corrected risk propagation model information 221 illustrated in FIG. 10, since the risk ID "R-04" has occurred, the initial value and the final value of the conditional occurrence probability are 1 and the parent risk progress degree effect and the risk progress degree effect are "0", regardless of whether the parent risk occurrence situation is "occurred" or "not occurred".

Then, the conditional occurrence probability of the risk is "1", regardless of whether the parent risk has occurred or has not occurred. In addition, since correction has not been performed, all of the initial value, the parent risk progress degree effect, and the final value of the amount of propagation are "0", as can be seen from the row corresponding to the risk ID "R-04" in FIG. 18.

In the following description, it is assumed that the corrected risk propagation model information 221 (the correction result of the conditional occurrence probability) illustrated in FIG. 10, the corrected risk information 222 (the correction result of the degree of influence) illustrated in FIG. 11, and the correction result of the amount of propagation illustrated in FIG. 18 are obtained by the above-mentioned processes.

In the calculation of the degree of contribution which will be described below, a case in which various correction processes based on the degree of progress are considered and a case in which the correction processes are not considered are compared with each other. For the comparison, the amounts of correction of the parent risk progress degree effect and the risk progress degree effect according to the degree of progress are set to 0 and Step S120 is performed again. In the following description, it is assumed that corrected risk propagation model information for calculating the degree of contribution illustrated in FIG. 21, the corrected amount of propagation for calculating the degree of contribution illustrated in FIG. 22, and corrected risk information for calculating the degree of contribution illustrated in FIG. 23 are obtained. Returning to the flowchart illustrated in FIG. 1, the risk occurrence probability calculation unit 324 calculates the occurrence probability of each risk from the corrected risk propagation model information 221 (S130). A specific example of the calculation of the occurrence probability will be described with reference to FIG. 19.

First, the occurrence probability of a risk without the parent risk is calculated from the corrected risk propagation model information 221. Since the parent risk is absent, the conditional occurrence probability in the corrected risk propagation model information 221 becomes the occurrence probability, without any change. For example, as can be seen from the risk propagation model master information illustrated in FIG. 3, the risk ID "R-01" does not have the parent risk. Therefore, the final value of the conditional occurrence probability of the risk ID "R-01" in the corrected risk propagation model information 221 illustrated in FIG. 10 is read and the occurrence probability of the risk ID "R-01" is 0.3 as illustrated in a table 470 of FIG. 19.

Then, for a risk with the parent risk whose occurrence probability has been calculated, the occurrence probability of the risk is calculated from the occurrence probability of the parent risk and the corrected risk propagation model information 221. Specifically, the sum of the product of the occurrence probability of the parent risk and the conditional occurrence probability in a case in which the parent risk has occurred and the product of the non-occurrence probability (a value obtained by subtracting the occurrence probability from 1) of the parent risk and the conditional occurrence probability in a case in which the parent risk has not occurred is calculated as the occurrence probability.

For example, as can be seen from the risk propagation model master information 211 illustrated in FIG. 3, the parent risk of the risk ID "R-02" is "R-01". In the table 470 illustrated in FIG. 19, the occurrence probability "0.3" of "R-01" is calculated. Therefore, the non-occurrence probability of the parent risk "R-01" is "0.7" which is calculated by subtracting the occurrence probability "0.3" from 1. In addition, as can be seen from the corrected risk propagation model information 221 illustrated in FIG. 10, the final value of the conditional occurrence probability of the risk ID "R-02" in a case in which the parent risk has occurred is "0.4" and the final value of the conditional occurrence probability of the risk ID "R-02" in a case in which the parent risk has not occurred is "0.05". Therefore, the occurrence probability of the risk ID "R-02" is calculated as "0.16" that is the sum of the product of the occurrence probability "0.3" of the risk and the conditional occurrence probability "0.4" in a case in which the parent risk has occurred and the product of the non-occurrence probability "0.7" of the parent risk and the conditional occurrence probability "0.05" in a case in which the parent risk has not occurred (see the table 471 illustrated in FIG. 19).

Similarly, the occurrence probability of the risk ID "R-04" is calculated as "1" and the occurrence probability of the risk ID "R-03" is calculated as "0.16" (a table 472 illustrated in FIG. 19). In addition, in order to calculate the degree of contribution, Step S130 is performed again to calculate occurrence probability for calculating the degree of contribution, using the corrected risk propagation information illustrated in FIG. 21 instead of the corrected risk propagation information illustrated in FIG. 10. In the following description, it is assumed that the occurrence probability illustrated in FIG. 24 is obtained.

Then, the risk score calculation unit 325 calculates a risk score and the expected value of the risk score from the corrected amount of propagation calculated in Step S120, the corrected risk information 212, and the occurrence probability of the risk calculated in Step S130 (S140). The risk score is obtained by adding the indirect influence of each risk caused by risk propagation to the degree of direct influence of each risk and is a value obtained by adding the product of the risk score of the child risk and the amount of propagation to the child risk to the degree of influence of the risk. A detailed method for calculating the risk score will be described with reference to FIG. 20.

Occurrence probability and the degree of influence in a table 2231 illustrated in FIG. 20 are acquired from the calculation result of the occurrence probability (the table 472 in FIG. 19) in Step S130 and the final value of the degree of influence in the corrected risk information 222 illustrated in FIG. 11, respectively.

Then, the product of them is calculated and the expected value of the degree of influence is calculated. For example, for the risk ID "R-01" in the table 2231 illustrated in FIG. 20, the product "450" of an occurrence probability of "0.3" and a degree of influence of "1500" is the expected value of the degree of influence. Then, for a risk without the child risk, the degree of influence and the expected value of the degree of influence are used as the risk score and the expected value of the risk score without any change.

For example, as can be seen from the risk propagation model master information 211 illustrated in FIG. 3, the risks ID "R-03" and "R-04" do not have a child risk. Therefore, in the table 2231 illustrated in FIG. 20, the risk scores of "R-03" and "R-04" are "1500" and "1000" which are the values of the degrees of influence, respectively. Similarly, the expected values of the risk scores of "R-03" and "R-04" are "240" and "1000" which are the expected values of the degrees of influence, respectively.

Then, for all risks with the child risks whose risk scores have been calculated, a value obtained by adding the product of the amount of propagation to the child risk and the risk score of the child risk to the degree of influence of the risk is used as the risk score of the risk. In addition, the product of the risk score and the occurrence probability is used as the expected value of the risk score.

For example, in FIG. 20, as can be seen from the risk propagation model master information 211 illustrated in FIG. 3, the risk ID "R-02" has only a child risk "R-03" (a risk having "R-02" as the parent risk). Therefore, since the risk scores of all of the child risks of "R-02" have been calculated, the risk score of "R-02" is calculated.

As can be seen from FIG. 18, the final value of the amount of propagation from the parent risk ID "R-02" to the child risk ID "R-03" is "0.4". In the table 2231 illustrated in FIG. 20, the product of the final value and the risk score "1500" of the risk ID "R-03" is "600". The sum "2400" of this value and the degree of influence "1800" of the risk ID "R-02" in the table 2231 illustrated in FIG. 20 is used as the risk score of the risk ID "R-02" (a table 2232 illustrated in FIG. 20). In addition, the product "384" of this value and the occurrence probability "0.16" of the risk ID "R-02" in the table 2231 illustrated in FIG. 20 is used as the expected value of the risk score of the risk ID "R-02".

Similarly, in a case in which the risk score of the risk ID "R-01" and the expected value of the risk score are calculated in a state in which the risk scores of the risk IDs "R-02", "R-03", and "R-04" are calculated as in the table 2231 illustrated in FIG. 20, the risk score and the expected value are "2340" and "702", respectively, and the risk score information 223 illustrated in FIG. 12 is obtained. In a case in which there are a plurality of child risks, the product of the occurrence probability and the risk score of each child risk is calculated and the calculated values are added.

In addition, in order to calculate the degree of contribution, Step (S140) is performed again to calculate the risk score for calculating the degree of contribution, using the corrected risk information illustrated in FIG. 23 instead of the corrected risk information illustrated in FIG. 11, the calculation result of the occurrence probability in Step S130 illustrated in FIG. 24 instead of the calculation result of the occurrence probability in Step S130 illustrated in the table 472 of FIG. 19, and the amount of propagation illustrated in FIG. 22 instead of the amount of propagation illustrated in FIG. 18. In the following description, it is assumed that the risk score for calculating the degree of contribution illustrated in FIG. 25 is obtained.

Then, the contribution degree calculation unit 326 calculates the degree of contribution of the degree of progress for the expected value of each risk score (S150). The degree of contribution of the degree of progress is calculated as the difference between the expected value of the risk score which is calculated considering correction based on the degree of progress and the expected value of the risk score which is calculated without considering correction based on the degree of progress.

In FIG. 26, an example of the expected value of the risk score is the expected value of the risk score which is calculated considering correction based on the degree of progress and is obtained from the risk score information 223 illustrated in FIG. 12. In contrast, an example of the expected value of the risk score (without correction based on the degree of progress) is the expected value of the risk score which is calculated without considering correction based on the degree of progress and is obtained from the risk score information illustrated in FIG. 25. Then, the difference between the expected value of the risk score and the expected value of the risk score (without correction based on the degree of progress) is calculated as the degree of contribution of the degree of progress.

For example, as can be seen from FIG. 26, since the expected value of the risk score of the risk "R-01" is "702" and the expected value of the risk score (without correction based on the degree of progress) of the risk "R-01" is "695", the difference between the values is "7", which is used as the degree of contribution of the degree of progress of "R-01". In the following description, it is assumed that the degree of contribution illustrated in FIG. 26 is calculated for the other risks by the same method as described above, an example of a product ID, a risk ID, and the degree of contribution of the degree of progress illustrated in FIG. 26 is extracted, and the contribution degree information 224 illustrated in FIG. 13 is calculated.

Then, the predicted cost calculation unit 327 predicts the cost of each product from the estimated cost information 214 and the expected value of the degree of influence in the risk score information 223 (S160). A detailed method for calculating the predicted cost will be described with reference to FIG. 14.

First, the expected value of the degree of influence of each risk in the risk score information 223 illustrated in FIG. 12 is distributed to each month on the basis of the production planning information 231 illustrated in FIG. 8. For example, as can be seen from the risk propagation model master information 211 illustrated in FIG. 3, the risk ID "R-01"

occurs in the process ID "P-01". As can be seen from the production planning information 231 illustrated in FIG. 8, the process ID "P-01" corresponding to the product ID "A-01" is scheduled to start "January" and to end "February". Therefore, in the risk score information 223 illustrated in FIG. 12, the expected value "450" of the degree of influence of the process ID "A-01" and the risk ID "R-01" is halved and half (225) of the expected value of the degree of influence is distributed to each of "January" and "February". Similarly, for the other risks, the expected value of the degree of influence is distributed and is monthly added up to calculate the expected value of the degree of influence illustrated in FIG. 14.

In the predicted cost information 225 illustrated in FIG. 14, an example of the reserve capacity for risks is reserve capacity for risks acquired from the estimated cost information 214 illustrated in FIG. 7. In the predicted cost information 225 illustrated in FIG. 14, the difference between the expected value of the degree of influence and the reserve capacity for risks is calculated as a cost increment and the sum of the estimated cost and the cost increment is calculated as the predicted cost.

For example, in FIG. 14, for the product ID "A-01", in "January", "144 (k¥)" that is the difference between the expected value "869" of the degree of influence and the reserve capacity "725 (k¥)" for risks is a cost increment and the sum "2144 (k¥)" of the cost increment and the estimated cost "2000 (k¥)" is the predicted cost.

In addition, the expected value of the degree of influence, the reserve capacity for risks, the cost increment, and the predicted cost for each month are added up for the entire period to calculate each value in the row in which "total" is written in the month field. For example, the total predicted cost of the product ID "A-01" from January to March is calculated and the "total" predicted cost of the product is "4243 (k¥)". In the following description, it is assumed that the predicted cost information 225 is calculated as illustrated in FIG. 14.

In addition, for an output screen which will be described below, Step (S160) is performed to calculate the predicted cost in a case in which correction based on the degree of progress is not considered, using the risk score information illustrated in FIG. 25 instead of the risk score information illustrated in FIG. 12. In the following description, it is assumed that the predicted cost illustrated in FIG. 27 is obtained as the predicted cost in a case in which correction based on the degree of progress is not considered.

Then, the display control unit 328 stores the corrected risk propagation model information 221, the corrected risk information 222, the risk score information 223, the contribution degree information 224, and the predicted cost information 225 stored in the memory unit 310 in the output information 220 and displays the output information 220 on the input/output unit 100 (S170).

FIG. 28 illustrates an example of the output screen according to Embodiment 1. The total estimated cost, the total predicted cost, the total expected value of the degree of influence, and the total cost increment for each product ID are displayed on the upper left side of the screen on the basis of the row in which "total" is written in the month field in the predicted cost information 225 (FIG. 14). This screen makes it possible to recognize the cost increment for each product and thus to specify a product which has a large cost increment and requires measures. In addition, predicted cost, an expected value of the degree of influence, and a cost increment in a case in which correction based on the degree of progress is not considered are displayed in the upper right side of the screen on the basis of the predicted cost information (FIG. 27) in the case in which correction based on the degree of progress is not considered. Therefore, it is possible to recognize how the predicted cost changes according to the degree of progress.

In a case in which the user designates a product ID, using, for example, a method of clicking the product ID in the upper table, the occurrence probability, the expected value of the degree of influence, and the expected value of the risk score of the product ID are acquired from the risk score information 223 and the degree of contribution of the degree of progress of the product ID is acquired from the contribution degree information 224. The acquired information is displayed in a central portion of the screen.

The estimated cost and the predicted cost for each month are acquired from the predicted cost information 225 and a graph indicating the costs is displayed in a lower part of the screen. The outputs make it possible to specify risks that will occur in the product from the expected value of the risk score and to know the degree of contribution of the degree of progress of each risk. Therefore, in a case in which the degree of contribution is high, it is possible to make a plan which takes measures to risks as soon as possible to reduce occurrence probability and reduces costs.

The graph indicating the estimated cost and the predicted cost enables the user to recognize when the cost exceeds the estimated cost and to manage the cost early so as not to exceed the estimated cost.

In the description of Embodiment 1, cost is used as a business index and the degree of influence indicates additional cost. However, for example, the number of delay days may be considered as the degree of influence and the degree of influence of inventories or cash flow on the business index may also be evaluated.

Embodiment 2

In Embodiment 1, the risk propagation model master information 211 and the risk information 212 are corrected using the degree of progress of each process. However, the information may be corrected using different indexes. In Embodiment 2, a method which performs correction using the degree of pressure of work resources related to each product and each process will be described.

Here, the work resources mean resources required for production, such as workers and operating machines. In addition, the degree of pressure of the work resources is an index indicating the degree of pressure of workload on work capacity in each work resource. A method for calculating the degree of pressure will be described below.

The configuration of a system according to Embodiment 2 differs from the configuration of the system illustrated in FIG. 2 in that the progress degree calculation unit 322 is substituted with a pressure degree calculation unit 329 which calculates the degree of pressure and a work resource management system 40 is added as the system connected through the network, instead of the production result management system 30, as illustrated in FIG. 30.

In Embodiment 2, the risk correction master information 213 of the input information 210 and the corrected risk propagation model information 221, the corrected risk information 222, and the contribution degree information 224 of the output information 220 are configured by substituting the degree of progress in various kinds of information (see FIG. 6, FIG. 10, FIG. 11, and FIG. 13) in Embodiment 1 with the degree of pressure.

In addition, the risk propagation model master information 211, the risk information 212, and the estimated cost information 214 of the input information 210 and the risk score information 223 and the predicted cost information 225 of the output information 220 use various kinds of information (see FIG. 3, FIG. 5, FIG. 7, FIG. 12, and FIG. 14) in Embodiment 1. In addition to the input information 210, the production planning information 231 acquired from the production planning system 20 is different from that in Embodiment 1 (see FIG. 8) in that a work resource ID is added, instead of the scheduled work time (see FIG. 31).

Work resource information 233 is information for managing the daily workload and daily work capacity of each work resource. For example, as illustrated in FIG. 32, the work resource information 233 includes a work resource ID, a date, workload, and work capacity. As can be seen from the work resource information 233 illustrated in FIG. 32, for example, a work resource ID "M-01" has a workload of "70" and a work capacity of "80" on "1/5".

A flowchart illustrated in FIG. 29 differs from the flowchart illustrated in FIG. 1 in that the calculation of the degree of progress (S110) is substituted with the calculation of the degree of pressure (S1101). The operation of each function of a business management system 10 illustrated in FIG. 30 will be described according to the flowchart illustrated in FIG. 29. However, the description of the same steps as those in Embodiment 1 will not be repeated.

The data acquisition unit 321 acquires the work resource information 233 from the work resource management system 40, in addition to the risk propagation model master information 211, the risk information 212, the risk correction master information 213, the estimated cost information 214, and the production planning information 321 (S100). In the following description, it is assumed that information obtained by substituting the degree of progress in the information illustrated in FIGS. 3 to 7 with the degree of pressure and the information illustrated in FIGS. 31 and 32 are acquired as various kinds of input information.

Then, the pressure degree calculation unit 329 calculates the degree of pressure of the work resources in the process in which each risk occurs (S1101). For example, as can be seen from the production planning information 231 illustrated in FIG. 31, for a process "P-01" corresponding to a product ID "A-01", a work resource ID that is used is "M-01", the scheduled start date of the work is "1/5", and the scheduled end date of the work is "2/15". In the work resource information illustrated in FIG. 32, the total workload and the total work capacity of the work resource "M-01" for the period from the scheduled start date "1/5" to the scheduled end date "2/15" are calculated. A total workload of "2000" and a total work capacity of "2400" are obtained and the total workload is divided by the total work capacity to obtain the degree of pressure "0.83" of the product ID "A-01" and the process ID "P-01" illustrated in FIG. 33. In the following description, it is assumed that the degree of pressure is calculated as illustrated in FIG. 33.

Then, the risk correction unit 323 corrects the risk propagation model master information 211 and the risk information 212 for each product, using the risk correction master information 213 and the degree of pressure calculated in Step S1101 (S120). This step differs from Step S120 described in Embodiment 1 in that the calculation result of the degree of pressure illustrated in FIG. 33 is used instead of the calculation result of the degree of progress illustrated in FIG. 15 and the degree of progress is substituted with the degree of pressure in each step. Then, Steps S130 to S170 are performed by the same method as that in Embodiment 1 (the degree of progress in Embodiment 1 is substituted with the degree of pressure).

The above-mentioned processes make it possible to predict cost or to specify risks to be managed, considering the relationship in which, as the degree of pressure of the work resources increases, the degree of influence when risks occur increases and risks are likely to occur (the amount of propagation increases) with the occurrence of the parent risk. In addition, the degree of contribution of the degree of pressure for each risk is known. Therefore, in a case in which the degree of contribution is high, it is possible to examine a plan that circulates the resources between departments in advance to reduce the degree of pressure as measures to risks.

Embodiment 3

In Embodiment 1, the risk propagation model master information 211 and the risk information 212 are corrected using the degree of progress of each process. In Embodiment 2, the risk propagation model master information 211 and the risk information 212 are corrected using the degree of pressure of each work resource. However, the information may be corrected using a combination of the degree of progress and the degree of pressure. In Embodiment 3, a correction method using a combination of the degree of progress and the degree of pressure will be described.

The configuration of a system according to Embodiment 3 differs from the configuration of the system illustrated in FIG. 2 in that a pressure degree calculation unit 329 is added to the arithmetic processing unit 320 and a work resource management system 40 is added as the system connected through the network, as illustrated in FIG. 35. The other configurations are the same as those in Embodiment 1. In addition, the pressure degree calculation unit 329 and the work resource management system 40 are the same as those in Embodiment 2.

A flowchart illustrated in FIG. 34 differs from the flowchart illustrated in FIG. 1 in that the calculation of the degree of pressure (S1101) is added after the calculation of the degree of progress (S110).

Since each step is the same as that in Embodiment 1 or Embodiment 2, the description thereof will not be repeated.

In Embodiment 3, both the degree of progress and the degree of pressure are considered. Therefore, it is possible to more realistically perform cost prediction or the specification of risks to be managed than that in a case in which only one of the degree of progress and the degree of pressure is considered.

In the above-described embodiment, the system includes the input/output unit 100 that acquires data required for the process of the system and displays the processing result, the risk correction unit 323 that corrects, for each product, at least one of the risk propagation model master information 211 for managing possible risks and the causal relationship between the risks and the risk information 212 for managing the occurrence situation and the degree of influence of each risk for each product, using the degree of progress of each process, and the risk score calculation unit 325 that calculates the risk score of each risk from the corrected risk propagation model information 221 and the corrected risk information 222.

According to the above-described embodiment, the occurrence probability, the degree of propagation, and the degree of influence of each risk are corrected according to the progress situation of each process. Therefore, it is possible to appropriately predict the degree of influence on the business index and to support the determination of risks to be managed.

In above-described embodiment, an example of the cost management for each product has been described. However, the same risk management as described above may be performed for various business indexes such as inventories and cash flow.

REFERENCE SIGNS LIST

10: BUSINESS MANAGEMENT SYSTEM
100: INPUT/OUTPUT UNIT
200: STORAGE UNIT
210: INPUT INFORMATION
211: RISK PROPAGATION MODEL MASTER INFORMATION
212: RISK INFORMATION
213: RISK CORRECTION MASTER INFORMATION
214: ESTIMATED COST INFORMATION
220: OUTPUT INFORMATION
221: CORRECTED RISK PROPAGATION MODEL INFORMATION
222: CORRECTED RISK INFORMATION
223: RISK SCORE INFORMATION
224: CONTRIBUTION DEGREE INFORMATION
225: PREDICTED COST INFORMATION
300: ARITHMETIC UNIT
310: MEMORY UNIT
320: ARITHMETIC PROCESSING UNIT
321: DATA ACQUISITION UNIT
322: PROGRESS DEGREE CALCULATION UNIT
323: RISK CORRECTION UNIT
324: RISK OCCURRENCE PROBABILITY CALCULATION UNIT
325: RISK SCORE CALCULATION UNIT
326: CONTRIBUTION DEGREE CALCULATION UNIT
327: PREDICTED COST CALCULATION UNIT
328: DISPLAY CONTROL UNIT
329: PRESSURE DEGREE CALCULATION UNIT
20: PRODUCTION PLANNING SYSTEM
231: PRODUCTION PLANNING INFORMATION
30: PRODUCTION RESULT MANAGEMENT SYSTEM
232: PRODUCTION RESULT INFORMATION
40: WORK RESOURCE MANAGEMENT SYSTEM
233: WORK RESOURCE INFORMATION

The invention claimed is:

1. A business management system comprising:
a server that includes an output unit, a storage unit, and a processor,
wherein the storage unit stores a risk propagation model master information table that stores risk propagation model master information for managing a causal relationship between a plurality of possible risks and a risk information table that stores risk information for managing an occurrence situation of the risk and a degree of influence indicating a magnitude of influence of the risk on a business index for each product of a plurality of products, the degree of influence being determined based on a production situation for each product,
the processor is configured to:
determine production result information for each product based on an actual production of each product;
determine the production situation for each product based on a comparison between the production result information and production planning information;
correct the risk propagation model master information and the risk information for each product, using at least one of a degree of progress which is an index indicating progress of each process and a degree of pressure which is an index indicating a pressure level of workload on work capacity in work resources required to produce the product; and
calculate a risk score which is a value obtained by adding indirect influence caused by propagation of the risk to direct influence of the risk, on the basis of the corrected risk propagation model master information and the corrected risk information, and
the output unit outputs the risk score calculated by the processor for each product in each process to a screen,
wherein the processor is further configured to calculate occurrence probability of the risk from the corrected risk propagation model information,
the processor calculates an expected value of the degree of influence of the risk and an expected value of the risk score, on the basis of the corrected risk propagation model information, the corrected risk information, and the occurrence probability of the risk, and
the output unit outputs a visual indication of an effect of correcting the risk propagation model master information and the risk information for each product by illustrating how a predicted cost changes according to the degree of progress, the visual indication including:
on an upper left side of the screen, a total estimated cost for each product, and a total predicted cost, a total expected value of the degree of influence, and a total cost increment for each product in a case in which correction is performed based on the degree of progress, and
on an upper right side of the screen, the total predicted cost, the total expected value of the degree of influence, and the total cost increment for each product in a case in which correction based on the degree of progress is not considered.

2. The business management system according to claim 1, wherein the output unit outputs at least the expected values of the degree of influence of the risk before and after the processor performs the correction to the screen.

3. A business management system comprising:
a server that includes an output unit, a storage unit, and a processor,
wherein the storage unit stores a risk propagation model master information table that stores risk propagation model master information for managing a causal relationship between a plurality of possible risks and a risk information table that stores risk information for managing an occurrence situation of the risk and a degree of influence indicating a magnitude of influence of the risk on a business index for each product, the degree of influence being determined based on a production situation for each product,
the processor is configured to:
determine production result information for each product based on an actual production of each product;
determine the production situation for each product based on a comparison between the production result information and production planning information;
correct the risk propagation model master information and the risk information for each product, using at least one of a degree of progress which is an index indicating progress of each process and a degree of pressure which is an index indicating a pressure level of workload on work capacity in work resources required to produce the product; and calculate a risk score which is a value obtained by adding indirect influence caused by propagation of the risk to direct influence of the risk, on the basis of the corrected risk propagation model master information and the corrected risk information, and the output unit outputs the risk score calculated by the processor for each product in each process to a screen and outputs a visual indication of an effect of correcting the risk propagation model master information and the risk information for each product by illustrating how a predicted cost changes according to the degree of progress, the visual indication including:

on an upper left side of the screen, a total estimated cost for each product, and a total predicted cost, a total expected value of the degree of influence, and a total cost increment for each product in a case in which correction is performed based on the degree of progress, and on an upper right side of the screen, the total predicted cost, the total expected value of the degree of influence, and the total cost increment for each product in a case in which correction based on the degree of progress is not considered, wherein the processor is further configured to calculate the degree of progress from the production planning information and the production result information.

4. A business management system comprising:

a server that includes an output unit, a storage unit, and a processor, wherein the storage unit stores a risk propagation model master information table that stores risk propagation model master information for managing a causal relationship between a plurality of possible risks and a risk information table that stores risk information for managing an occurrence situation of the risk and a degree of influence indicating a magnitude of influence of the risk on a business index for each product, the degree of influence being determined based on a production situation for each product, the processor is configured to:

determine production result information for each product based on an actual production of each product;

determine the production situation for each product based on a comparison between the production result information and production planning information;

correct the risk propagation model master information and the risk information for each product, using at least one of a degree of progress which is an index indicating progress of each process and a degree of pressure which is an index indicating a pressure level of workload on work capacity in work resources required to produce the product; and calculate a risk score which is a value obtained by adding indirect influence caused by propagation of the risk to direct influence of the risk, on the basis of the corrected risk propagation model master information and the corrected risk information, and the output unit outputs the risk score calculated by the processor for each product in each process to a screen and outputs a visual indication of an effect of correcting the risk propagation model master information and the risk information for each product by illustrating how a predicted cost changes according to the degree of progress, the visual indication including:

on an upper left side of the screen, a total estimated cost for each product, and a total predicted cost, a total expected value of the degree of influence, and a total cost increment for each product in a case in which correction is performed based on the degree of progress, and on an upper right side of the screen, the total predicted cost, the total expected value of the degree of influence, and the total cost increment for each product in a case in which correction based on the degree of progress is not considered, wherein the processor is further configured to calculate the degree of pressure from the production planning information and work resource information.

5. The business management system according to claim 1, the output unit outputs the estimated cost and the predicted cost calculated by the processor to the screen in a form of a graph.

6. The business management system according to claim 1, wherein the processor is further configured to calculate a degree of contribution of the degree of progress to at least one of the degree of influence of the risk, the expected value of the degree of influence of the risk, the risk score, and the expected value of the risk score.

7. The business management system according to claim 1, wherein the processor corrects the risk propagation model master information and the risk information for each product on the basis of the degree of progress of each process.

8. The business management system according to claim 1, wherein the processor corrects the risk propagation model master information and the risk information for each product on the basis of the degree of pressure of the resources.

9. The business management system according to claim 1, wherein the processor corrects the risk propagation model master information and the risk information for each product on the basis of the degree of progress of each process and the degree of pressure of the resources.

* * * * *